United States Patent [19]

Yamashita et al.

[11] 4,235,176

[45] Nov. 25, 1980

[54] STITCH PATTERN GENERATING SYSTEM FOR A SEWING MACHINE

[75] Inventors: Chikao Yamashita; Takao Sugaya; Noriyuki Yoshida, all of Nagoya, Japan

[73] Assignee: Brother Kogyo Kabushiki Kaisha, Aichi, Japan

[21] Appl. No.: 5,588

[22] Filed: Jan. 22, 1979

[30] Foreign Application Priority Data

Feb. 8, 1978 [JP] Japan ................................. 53-13111

[51] Int. Cl.$^3$ ............................................. D05B 3/02
[52] U.S. Cl. ............................ 112/158 D; 112/158 E
[58] Field of Search ........... 112/158 E, 158 R, 158 A, 112/158 D; 74/568 M; 318/281, 282

[56] References Cited

U.S. PATENT DOCUMENTS

| | | | |
|---|---|---|---|
| 4,066,029 | 1/1978 | Suchsland et al. | 112/158 E |
| 4,084,523 | 4/1978 | Kasuga | 112/158 A |
| 4,103,632 | 8/1978 | Bowles | 112/158 E |
| 4,186,675 | 2/1980 | Yamashita et al. | 112/158 D |

FOREIGN PATENT DOCUMENTS 2735428  2/1978  Fed. Rep. of Germany ....... 112/158 E Primary Examiner—Peter P. Nerbun
Attorney, Agent, or Firm—Browdy and Neimark

[57] ABSTRACT

A system is disclosed in which an information carrying member with multiple pieces of pattern information recorded thereon to control a stitch forming instrumentality is rotated intermittently by a step motor in forward and reverse directions according to a sequence predetermined for each stitch pattern. Each group of pattern information corresponding to each of the stitch patterns is recorded individually within a plurality of defined regions on the information carrying member, whose intermittent rotation effected at a rate of a small angle per step enables a scanning member to make a reciprocation relatively to the information carrying member within a preselected region, thereby sequentially picking up the pattern information related to placement of the stitches required for generating a desired stitch pattern.

6 Claims, 20 Drawing Figures

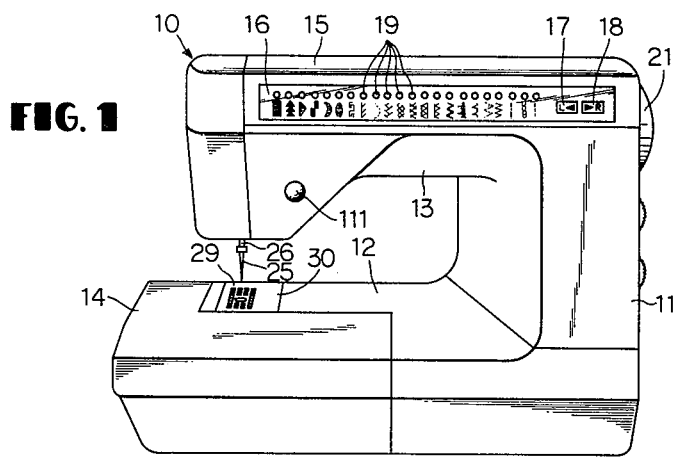
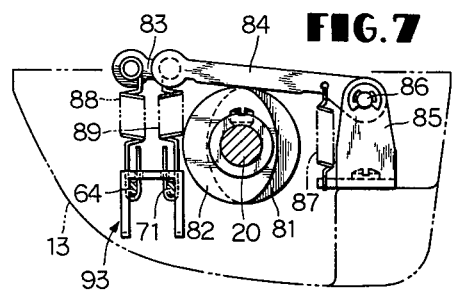
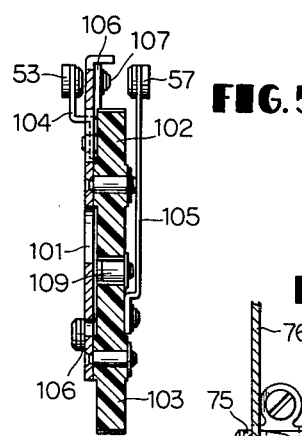
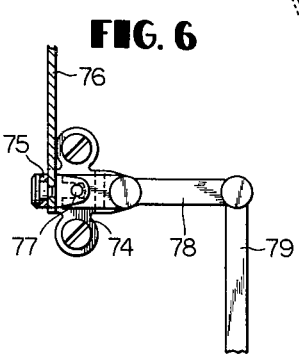
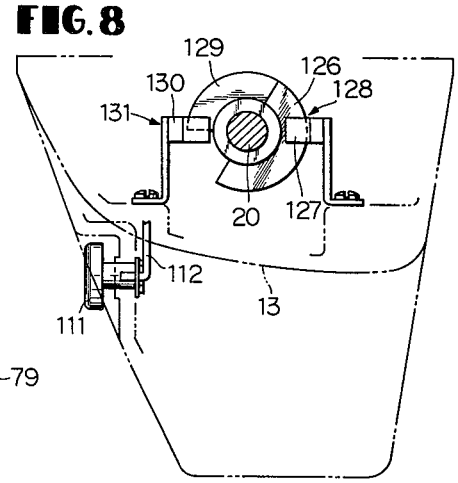

FIG. 10

| STITCH PATTERN | | ANGLE RANGE (DEGREE) OF EACH STEPPED CAM SURFACE ON TWO CAM MEMBERS | RADIUS OF EACH STEPPED CAM SURFACE ON THE FIRST CAM MEMBER R₁ (mm) | RADIUS OF EACH STEPPED CAM SURFACE ON THE SECOND CAM MEMBER R₂ (mm) | SEQUENCE |
|---|---|---|---|---|---|
| A | | 0 – 2 | 28.75 | 30 | |
| B | | 6 – 8 | 30 | 30 | |
| | | 8 – 10 | 27.5 | 30 | |
| C | | 10 – 12 | 30 | 29.2 | |
| | | 12 – 14 | 29.17 | 29.2 | |
| | | 14 – 16 | 28.33 | 29.2 | |
| | | 16 – 18 | 27.5 | 29.2 | |
| D | | 138 – 140 | 30 | 29.06 | |
| | | 140 – 142 | 28.75 | 29.06 | |
| | | 142 – 144 | 30 | 30 | |
| | | 144 – 146 | 27.5 | 28.44 | |
| | | 146 – 148 | 28.75 | 28.44 | |
| E | | 18 – 20 | 27.5 | 29.4 | |
| | | 20 – 22 | 27.5 | 29.4 | |
| | | 22 – 24 | 27.5 | 29.4 | |
| | | 24 – 26 | 27.5 | 28.8 | |
| | | 26 – 28 | 27.5 | 29.4 | |
| | | 28 – 30 | 30 | 28.8 | |
| F | | 50 – 52 | 30 | 30 | |
| | | 52 – 54 | 27.5 | 27.5 | |
| | | 54 – 56 | 27.5 | 30 | |
| | | 56 – 58 | 30 | 30 | |
| | | 58 – 60 | 30 | 27.5 | |
| | | 60 – 62 | 27.5 | 30 | |
| G | | 98 – 100 | 30 | 30 | |
| | | 100 – 102 | 29.17 | 27.5 | |
| | | 102 – 104 | 29.17 | 30 | |
| | | 104 – 106 | 28.33 | 30 | |
| | | 106 – 108 | 28.33 | 27.5 | |
| | | 108 – 110 | 27.5 | 30 | |

STITCH PATTERN GENERATING SYSTEM FOR A SEWING MACHINE

BACKGROUND OF THE INVENTION

The present invention relates to a system for generating stitch patterns for a sewing machine in which an information carrying member with multiple pieces of pattern information recorded thereon to control a stitch forming instrumentality is rotated by a step motor in forward and reverse directions, and a scanning member performs selective pickup of the pattern information sequentially with rotation of the information carrying member, thereby controlling the stitch forming instrumentality according to the pattern information thus picked up.

There is known a prior system for controlling the position of lateral oscillation of a needle in accordance with rotation of a bight information carrying member caused by a step motor. In such a system, a contact element operatively connected to a needle bar gate is engageable with an eccentric cam secured to the output shaft of the step motor, and the position of lateral oscillation of the needle is determined depending on the level of a cam surface with which the contact element comes into engagement. Accordingly, for enabling the needle to move from one extreme position to the other in its lateral oscillation by a single step synchronously with rotation of the main shaft of the sewing machine, it becomes necessary for the step motor to rotate the eccentric cam through a maximum angle. And this signifies that a remarkably high response speed is required of the step motor. That is, if the step motor fails in satisfying the requirement of such response performance, setting of the eccentric cam at a desired angular position during a high-speed operation mode of the sewing machine cannot be executed in completely timed relation to the rotation of the main shaft, so that there occurs an error in the needle position for penetration through work fabric as a result to cause disorder in the stitch pattern being formed.

Since the response performance of the step motor depends on the structure of the motor itself and a drive control means employed therefor, a great increase of the cost is unavoidable to achieve enhanced performance. Thus, it has been extremely difficult heretofore to accomplish a low-cost sewing machine of the type that controls the position of lateral oscillation of the needle by means of a step motor for generating a variety of stitch patterns.

SUMMARY OF THE INVENTION

The object of the present invention resides in providing a stitch pattern generating system capable of eliminating the above problems in a sewing machine. And more particularly it is an improved system wherein, although a small step motor commercially available today is employed therein, the position of lateral oscillation of a needle is determined, as well as the length and direction of feed movement of a feed dog are determined, in completely timed relation to the rotation of a main shaft even during a high-speed operation mode of the sewing machine without causing any disorder in each stitch pattern.

This object is attainable by enabling the step motor to be driven in such a manner that, when forming any stitch of a desired stitch pattern, its output shaft makes a small-angle rotation for regulating the stitch forming instrumentality, for example, for determining the position of lateral oscillation of the needle or the length and direction of feed movement of the feed dog. In a preferred embodiment of the invention, each group of bight information required for generating each of stitch patterns is recorded individually within a plurality of defined regions on a single cam member operatively connected to the output shaft of a step motor, so that the bight information in each group can be picked up sequentially by one scanning reciprocation of a scanning member or a contact element in each region according to a predetermined sequence. And similarly, groups of feed information are recorded on another cam member. One scanning reciprocation of the contact element is effected by rotating the cam member at a rate of small angle relatively to the contact element in accordance with the intermittent rotation of the step motor based on the predetermined sequence. Since the intermittent rotation of the step motor is executed within a maximum of 4° per step, no strict response performance is required of the step motor. Consequently, it becomes possible to install both a compact low-priced step motor and a general inexpensive drive control means within the sewing machine frame, thereby driving at least one information carrying member by them to achieve selective generation of any one of plurality of stitch patterns.

Moreover, in the present invention, manual operation of pattern selection means for obtaining a desired stitch pattern enables the step motor to rotate the information carrying member in the manner that the predetermined information for starting the formation of the stitch pattern in one group of pattern information corresponding to the desired stitch pattern is picked up first by the scanning member after the sewing machine is started to run, and the sequence control for the selected stitch pattern is activated to effect driving of the step motor synchronously with the main shaft. When the pattern selecting operation is performed in the preferred embodiment of the present invention, the contact element serving as a scanning member is disengaged from the cam member serving as an information carrying member, and in such a state the cam member is rotated until the contact element comes to be opposed to the pattern-formation starting cam surface of a group of stepped cam surfaces for a desired stitch pattern, and after the cam member is brought to a stop, the contact element is engaged with the said cam surface upon start of running the sewing machine.

Therefore, another object of the invention resides in providing such a stitch pattern generating system that is capable of executing speedy pattern selection in a sewing machine.

BRIEF DESCRIPTION OF THE DRAWINGS

The accompanying drawings illustrate an exemplary embodiment of the present invention, in which:

FIG. 1 is a front external view of a sewing machine;

FIG. 5 is a sectional view taken substantially along a line 5—5 in FIG. 2;

FIG. 6 is a sectional view taken substantially along a line 6—6 in FIG. 4;

FIG. 7 is a sectional view taken substantially along a line 7—7 in FIG. 3 with partial omission;

FIG. 8 is a sectional view taken substantially along a line 8—8 in FIG. 3;

FIG. 10 is an explanatory table of a cam-member driving sequence in forming a variety of stitch patterns;

DETAILED DESCRIPTION OF THE INVENTION

Figure 2:
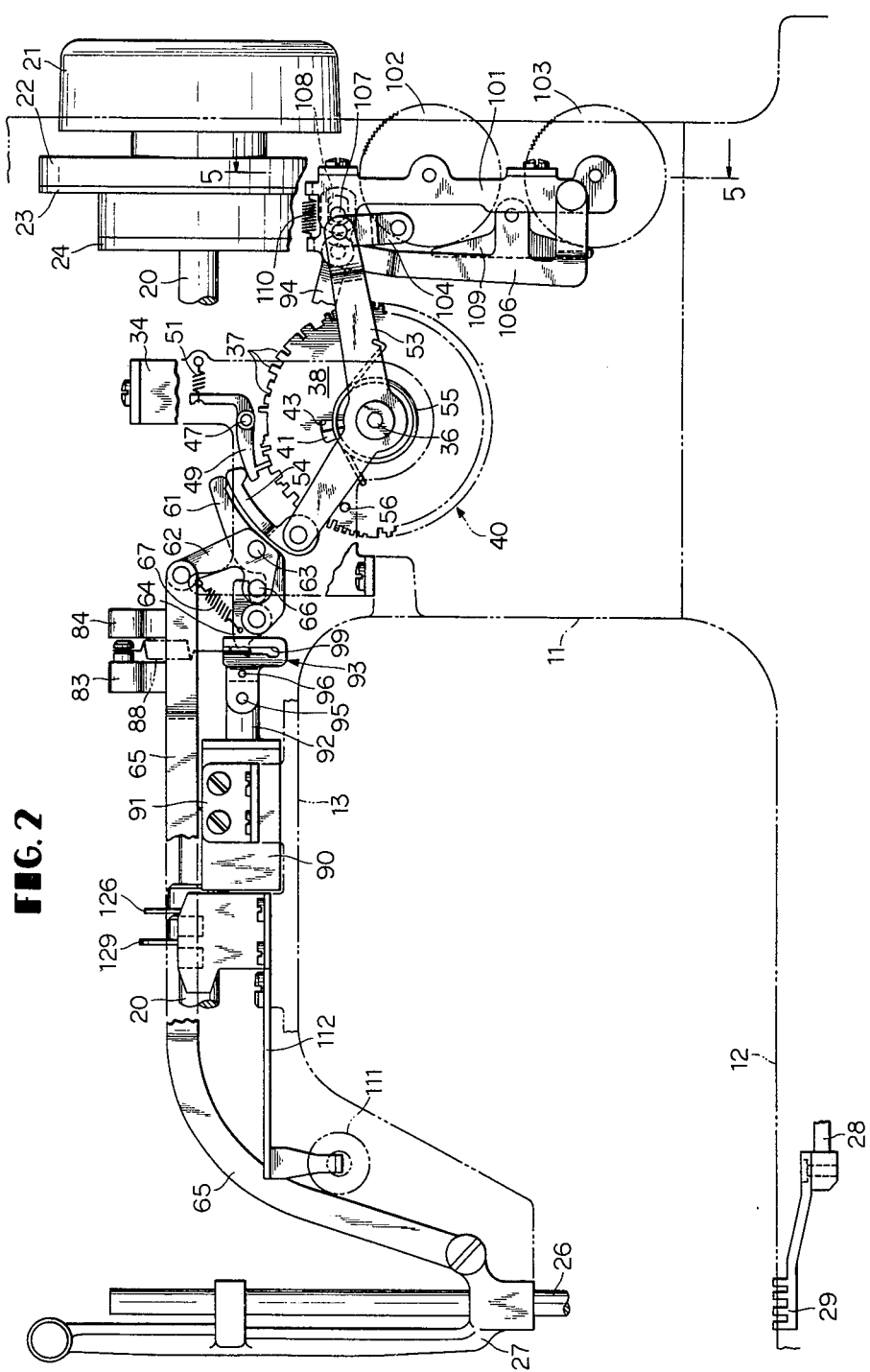
FIG. 2 is a front view of principal mechanisms in the sewing machine shown with omission of a frame thereof.

Referring first to FIG. 1, a sewing machine 10 has a bed 12 to support a standard 11, from which a bracket arm 13 extends to overhang the bed. A sub-plate 14 is attached adjacently to the bed 12 to form a wide work-fabric support surface in cooperation therewith. The bracket arm 13 has an upper opening closed with a top cover 15, on which a display panel 16 is provided. This panel visually displays all formable stitch patterns thereon and indicates one selected stitch pattern as will be described afterward. A pair of push buttons 17 and 18 protrude through the opening of the display plate 16 so that an operator can manipulate them manually. A row of indicating lamps 19 are disposed above the displayed stitch patterns correspondingly thereto, and only one lamp corresponding to the selected stitch pattern is turned on to indicate the said pattern.

Referring now to FIGS. 2 through 4 and 9, a main shaft 20 is journaled on the bracket arm 13, and its right end is equipped fixedly with a handwheel 21, a driving pulley 23 connected to an unshown electric motor through a belt 22, and a known timing pulley 24. A needle bar 26 with a needle 25 secured to the lower end thereof is supported in a vertically movable manner by a known needle bar gate 27 which is pivoted on the bracket arm 13. The needle bar 26 performs vertical reciprocation synchronously with rotation of the main shaft 20 and is oscillatable laterally with the needle bar gate. On the bed 12, a feed dog 29 attached fixedly to a feed bar 28 extends through an opening of a throat plate 30 secured to the bed 12 and is capable of protruding from the top surface of the throat plate 30 to feed the work fabric in a known manner synchronously with the main shaft 20. A feed regulator 31 is secured to a feed regulating shaft 32 supported by the bed 12 and is operatively connected to the feed bar 28 for regulating the fabric feeding action of the feed dog 29.

The standard 11 contains a pair of fixed support brackets 33 and 34, and a step motor 35 is secured to one bracket 33 with its output shaft 36 protruding toward the other bracket 34. The output shaft 36 interposed between the two brackets mounts loosely thereon a first cam member 38 having on its circumference a series of stepped cam surfaces 37 where multiple pieces of bight information are recorded individually for controlling the position of lateral oscillation of the needle. The output shaft 36 also mounts thereon fixedly a second cam member 40 having on its circumference a series of stepped cam surfaces 39 where multiple pieces of feed information are recorded individually for controlling the motion of the feed dog. Thus, the cam members 38 and 40 constitute a bight-information carrying member and a feed-information carrying member respectively. And a substantially annular intermediate member 42 having a lug portion 41 is interposed between the two cam members and is fitted loosely around a boss of the second cam member 40, and the lug portion 41 is fitted into through holes 43 and 44 formed on the two cam members respectively. The width of each through hole is selected to be larger than the width of the lug portion 41 so that the intermediate member 42 is rotatable relatively to each of the cam members 38 and 40 within a predetermined angle of, for example, approximately 10° in this embodiment. A first torsion spring 45 is anchored to the second cam member 40 at one end thereof and also to the intermediate member 42 at the other end thereof in the manner to urge the intermediate member 42 counterclockwise in FIG. 9 relative to the second cam member by a small elastic force. A second torsion spring 46 is anchored to the first cam member 38 at one end thereof and also to the intermediate member 42 at the other end thereof in the manner of urging the first cam member 38 clockwise in FIG. 9 relative to the intermediate member 42 by a small elastic force. Consequently, the first cam member 38 is always held at a predetermined relative angular position to the second cam member 40, and the respective through holes 43 and 44 are substantially coincident with each other at the said angular position. Assuming now that the first cam member 38 is locked, the second cam member 40 is rotatable independently within 10° or so both clockwise and counterclockwise. Thus, the intermediate member 42, the first and second torsion springs 45, 46 and the through holes 43, 44 of the two cam members constitute holding means which holds the first and second cam members 38 and 40 normally at the predetermined relative angular position and permits relative displacement of the two cam members from such angular position. The step motor 35 is so constructed as to be able to take 180-step stop positions during one revolution of the output shaft 36. Each of the cam members 38 and 40 has one cam surface per 2° unit angular range so that 180 pieces of bight information and 180 pieces of feed information are recorded on the entire cam surfaces.

A support shaft 47 is secured to one bracket 33 while being fitted into a bore 48 formed on the other bracket 34, and supports rotatably thereon a first contact finger 49 opposed to the first cam member 38 and also a second contact finger 50 opposed to the second cam member 40. As will be described afterward, the two contact fingers 49 and 50 are sequentially brought into engagement with the stepped cam surfaces 37 and 39 of the first and second cam members 38 and 40 respectively, and serve to determine the lateral oscillation position of the needle 25 and the set position of the feed regulator 31 in accordance with the heights of the cam surfaces synchronously with rotation of the main shaft. Thus, the two contact fingers 49 and 50 constitute a scanning member which selectively picks up desired pieces of the bight information and feed information prerecorded on the first and second cam members 38 and 40. The second contact finger 50 is movable along the support shaft 47, but the first contact finger 49 is prevented from moving along the shaft. A coil spring 51 is interposed between the first contact finger 49 and the bracket 34 for urging the contact finger 49 in the manner to disengage the same from the cam member 38. Similarly, a coil spring 52 is interposed between the second contact finger 50 and the bracket 33 for urging the contact finger 50 in the manner to disengage the same from the second cam member 40.

A first regulated member 53 is supported rotatably by the output shaft 36, and a first motion transmitting arm 54 pivoted at one end thereof is engaged with the arcuate top surface of the first contact finger 49. A torsion spring 55 is interposed between the first regulated member 53 and the bracket 34 for urging the member 53 counterclockwise in FIG. 2, and its one side edge bears against a pin 56 secured to the bracket 34, thereby preventing further rotation of the regulated member 53. In such a state, the motion transmitting arm 54 is in engagement with the first contact finger 49 at a position spaced apart most from the support shaft 47. Similarly, a second regulated member 57 is supported rotatably by the output shaft 36, and a second motion transmitting arm 58 pivoted at one end thereof is engaged with the arcuate top surface of the second contact finger 50. A torsion spring 59 is interposed between the second regulated member 57 and the bracket 33 for urging the member 57 counterclockwise in FIG. 4, and its one side edge bears against a pin 60 secured to the bracket 33, thereby preventing further rotation of the regulated member 57. In this state, the motion transmitting arm 58 is in engagement with the second contact finger 50 at a position spaced apart most from the support shaft 47.

A first actuating arm 61 and a first connection arm 62 are mounted rotatably on a pivot shaft 63 secured to the bracket 34, and one end of the actuating arm 61 is engaged with the arcuate top surface of the motion transmitting arm 54 while its other end has an actuating pawl 64 pivoted thereon. One end of the connection arm 62 is operatively connected to the needle bar gate 27 by way of a link 65, while its other end has a connection pin 66 secured thereto. This pin 66 is located between the first actuating arm 61 and the actuating pawl 64, and is normally held by the cooperation thereof with the elasticity of a weak coil spring 67 interposed between the actuating pawl 64 and the bracket 34. Similarly, a second actuating arm 68 and a second connection arm 69 are mounted rotatably on a pivot shaft 70 secured to the bracket 33, and one end of the actuating arm 68 is engaged with the arcuate top surface of the motion transmitting arm 58 while its other end has an actuating pawl 71 pivoted thereon. One end of the connection arm 69 is operatively connected to the feed regulating shaft 32 by way of a link mechanism (which will be described afterward), while its other end has a connection pin 72 secured thereto. This pin 72 is located between the second actuating arm 68 and the actuating pawl 71, and is normally held by the cooperation thereof with the elasticity of a weak coil spring 73 interposed between the actuating pawl 71 and the bracket 33.

Now the link mechanism will be described with reference to FIGS. 4 and 6, in which a short link 75 is pivoted on a support plate 74 fixed to the standard 11, and the link 75 and the connection arm 69 are connected to each other by way of an actuating link 76 in such a manner that the connection arm 69, the actuating link 76 and the short link 75 constitute a parallel motion mechanism. A pin 77 secured to the actuating link 76 is fitted into a forked lever 78 which is pivoted on the support plate 74 and is connected to an arm 80 secured to the feed regulating shaft 32 by way of another link 79. Accordingly, when the connection arm 69 is rotated, the feed regulating shaft 32 is also rotated in relation thereto to control the feed regulator 31.

Figure 9:
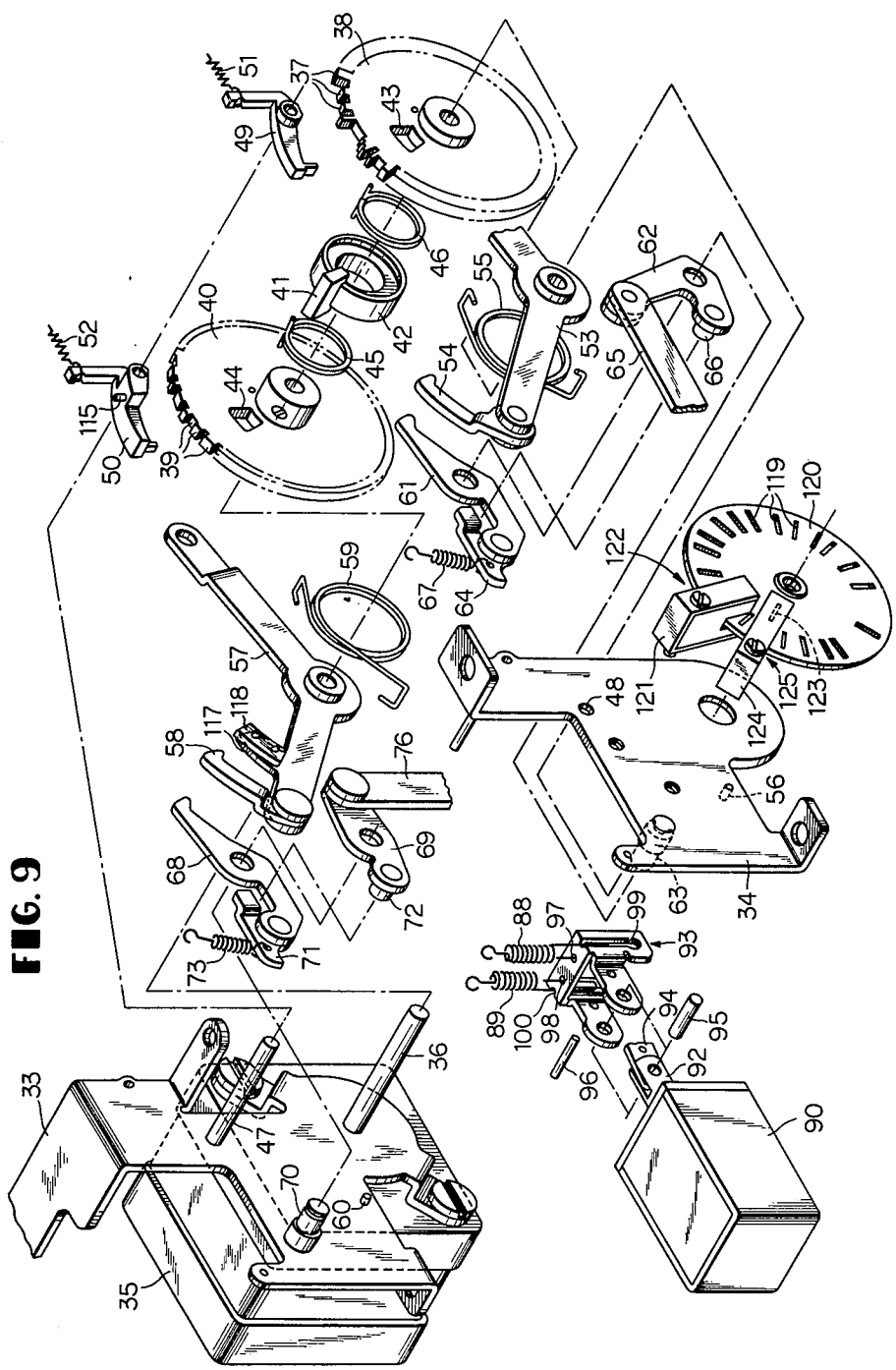
FIG. 9 is an exploded perspective view of components constituting the principal mechanisms of the sewing machine.

Referring to FIGS. 2 through 4 and 7, a pair of actuating cams 81 and 82 of the same shape are fixed to the main shaft 20 with a 180° angular phase difference, and a pair of actuating levers 83 and 84 opposed at the middle lower portions thereof to the actuating cams are mounted rotatably on a shaft 86 which is held on a support plate 85 fixed to the bracket arm 13. And both actuating levers are engaged with the actuating cams 81 and 82 respectively by the action of torsion springs 87 provided between these levers and the support plate 85. A pair of close-coiled helical springs 88 and 89 are secured at one end thereof to the actuating levers 83 and 84, and are anchored at the other ends thereof to the actuating pawls 64 and 71 detachably. An electromagnetic solenoid 90 is secured to the bracket arm 13 by means of a fitting plate 91, and a guide member 93 and an actuating bar 94 are coupled to an armature 92 of the solenoid by means of a shaft 95. The guide member 93 and the actuating bar 94 are connected to each other by a pin 96, as shown in FIG. 9, so as to be movable together. The guide member 93 has a pair of small holes 97, 98 and a pair of side slots 99, 100 through which the bent anchoring portions of the close-coiled helical springs 88 and 89 are inserted. Therefore, the helical springs are permitted to move only vertically in accordance with swing of the actuating levers 83 and 84 while being prevented from rotating within a horizontal plane. Since the spring constant of the helical springs 88 and 89 is greater than that of the coil springs 51 and 52, when the actuating lever 83 is swung up to its highest position as shown in FIG. 7, both the actuating arm 61 and the connection arm 62 are elastically urged clockwise in FIG. 2, so that the contact finger 49 is brought into engagement with the cam surface of the cam member 38 by way of the motion transmitting arm 54 against the elasticity of the coil spring 51. Similarly, in the state where the actuating lever 84 is swung up to its highest position, both the actuating member 68 and the connection arm 69 are elastically urged clockwise in FIG. 4, so that the contact finger 50 is brought into engagement with the cam surface of the cam member 40 by way of the motion transmitting member 58 against the elasticity of the coil spring 52. As the actuating levers 83 and 84 are swung downward by the actuating cams 81 and 82, the elastic force of the helical springs 88 and 89 being applied to the actuating pawls 64 and 71 are gradually reduced. And the actuating levers 83 and 84 are swung further downward even after the two helical springs reach the respective natural lengths. Consequently, upon substantial extinction of the elastic urging force to engage the contact fingers 49 and 50 with the cam members 38 and 40 against the actions of the coil springs 51 and 52, the contact fingers 49 and 50 are disengaged from the cam members 38 and 40 respectively due to the elasticity of the coil springs 51 and 52. Such disengagement of the contact fingers 49 and 50 is controlled by the actuating cams 81 and 82 with a 180° phase difference in relation to rotation of the main shaft 20. During the disengagement of the contact finger 49, the actuating arm 61 is rotated counterclockwise in FIG. 2 through the motion transmitting arm 54, but the connection arm 62 remains unrotated because the elasticity of the coil spring 67 is so weak and, in relation to rotation of the motion transmitting arm 54, the actuating pawl 64 is unable to cause following rotation of the connection arm 62 through the connection pin 66 by the action of the coil springs 67 against the aforementioned motional resistance of the needle bar gate 27 and link 65. Consequently, the needle 25 is free from idle motion with the needle bar 26 at every disengagement of the contact finger 49 from the cam member 38. For the same reason, the connection arm 69 remains unrotated during the disengagement of the contact finger 50 from the cam member 40, hence prohibiting idle motion of the feed regulator 31.

Figure 4:
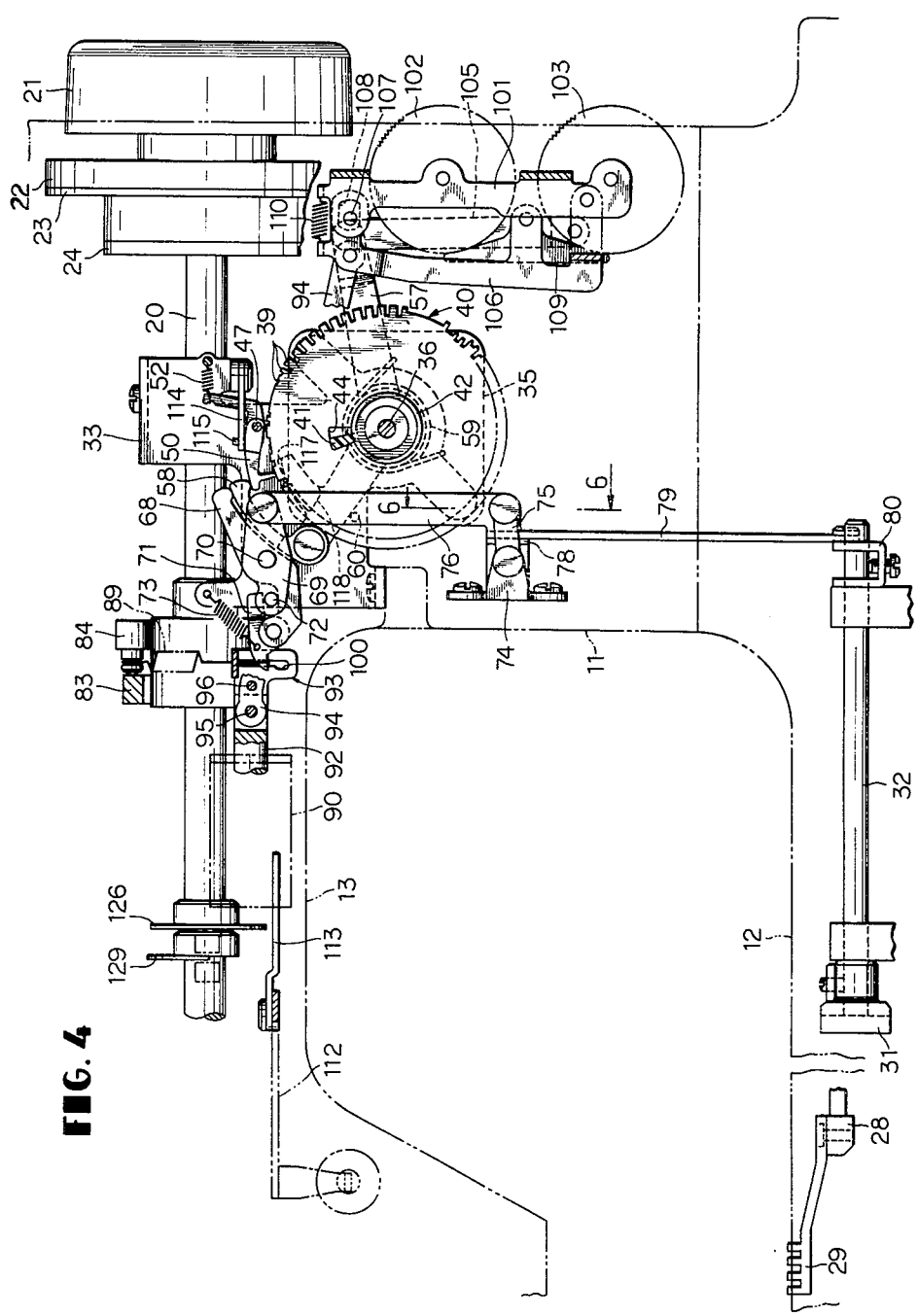
FIG. 4 is a sectional view taken substantially along a line 4—4 in FIG. 3.

Referring now to FIGS. 2, 4 and 5, a holder 101 fixed to the standard 11 is equipped with first and second manually operable dials 102 and 103 in a rotatable manner, which are operatively connected to the first and second regulated members 53 and 57 by way of links 104 and 105. A brake lever 106 is supported at its lower end rotatably by the holder 101, and has at its upper end a slot 108 where a guide pin 107 secured to the holder is fitted. And a brake piece 109 is pivoted on the middle portion of the brake lever 106. This lever is urged by a tension spring 110 provided between the lever itself and the holder 101 so that the brake piece 109 is normally pressed to the circumferences of the dials 102 and 103, which are thereby held at desired positions against the elasticity of the torsion springs 55 and 59. The brake lever 106 is connected at its upper end to the actuating bar 94 so as to be rotated against the elasticity of the tension spring 110 when the solenoid 90 is excited, thereby releasing the brake piece 109 to render the manually operable dials 102 and 103 free.

Figure 3:
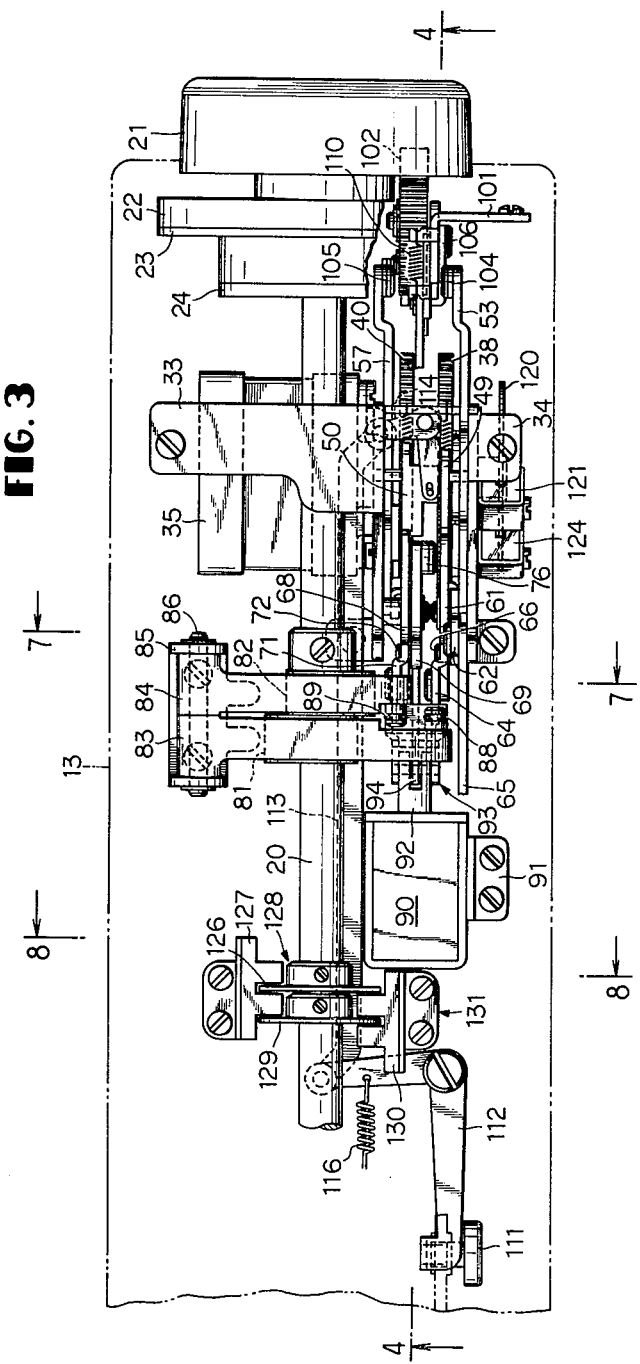
FIG. 3 is a top plan view of the mechanisms shown in FIG. 2.

Referring to FIGS. 3 and 4, a push button 111 is fixed at one end of an operated lever 112 mounted rotatably on the bracket arm 13 and is exposed in front of the jaw portion of the arm 13 so as to be depressed by the operator. The other end of the operated lever 112 is connected by way of a link 113 to one arm of a two-armed lever 114 pivoted on the bracket 33. The other arm of the lever 114 has a slot where a pin 115 secured to the second contact finger 50 is fitted. A tension spring 116 urges the operated lever 112 counterclockwise in FIG. 3, and when a portion of the lever 112 comes to butt against the bracket arm 13, its further rotation is prevented. In such a state, the second contact finger 50 is engageable with the cam surface 39 of the second cam member 40. In FIG. 9, a cam surface 117 for setting backward feed is formed on the regulated member 57 behind the cam member 40, and another cam surface for setting fixed fine backward feed is formed on a cam member 118 secured to the regulated member. The latter cam surface is located in front of the cam surface 117 and has an equal radius from the axis of rotation of the regulated member 57. The contact finger 50 is shifted to be opposed to the cam member 118 in response to slight depression of the push button 111, and is shifted to be opposed to the cam surface 117 in response to complete depression of the push button 111.

Now detailed description will be given on the stepped cam surfaces of the cam members 38 and 40 with reference to FIG. 10. Both bright information and feed information required to form each stitch pattern are recorded in the corresponding individual regions of the cam members 38 and 40. That is, one piece of bight information and one piece of feed information are required to form a straight stitch A, and both are recorded in the shape of cam surfaces each being within a 2° unit angular range of the cam members 38 and 40. And using these cam surfaces as a reference, two pieces of bight information and two pieces of feed information required to form a zigzag stitch B are recorded respectively in the shape of two cam surfaces within 6° to 10° angular ranges of the cam members 38 and 40. Similarly, a group of information required to form each of stitch patterns C through G is recorded in the shape of a group of cam surfaces within one defined region on each of the two cam members. As is obvious from the column relating to the stitch pattern D or E in the table of FIG. 10, the cam surfaces corresponding to the bight information or feed information to determine the arrangement of stitches constituting one stitch pattern are shaped in a predetermined sequence instead of being shaped adjacently to one another in the order of arrangement of the stitches. A positioning plate 120 having slits 119 equal in number to the formable stitch patterns is secured to the output shaft 36 of the step motor 35, and each of the slits is formed within the angular ranges of the cam surfaces related to the first bight and feed information for forming each stitch pattern, that is, at the position corresponding to the angular range in the uppermost row of the column related to each stitch pattern in FIG. 10. A sensor 121 mounted on the bracket 34 comprises a light emitting element (such as light emitting diode) and a light sensitive element (such as phototransistor) opposed to each other through the positioning plate 120. And one pulse is generated every time one of the slits 119 passes through the sensor 121 with rotation of the positioning plate 120. Thus, the positioning plate 120 and the sensor 121 constitute a pattern sensing device 122. The positioning plate 120 further has another slot 123, and another sensor 124 is mounted in relation thereto on the bracket 34 in the manner that the sensor 124 and the positioning plate 120 constitute a start-pattern sensing device 125, of which action will be described afterward.

Referring to FIGS. 3 and 8, a substantially semicircular shutter 126 is fixed to the main shaft 20, and a sensor 127 comprising a light emitting element and a light sensitive element opposed to each other through the shutter 126 is attached to the bracket arm 13. The sensor 127 and the shutter 126 constitute a timing pulse generator 128. Moreover, another shutter 129 and another sensor 130 are attached to the main shaft 20 and the arm 13 respectively to constitute a positioning pulse generator 131.

Figure 11:
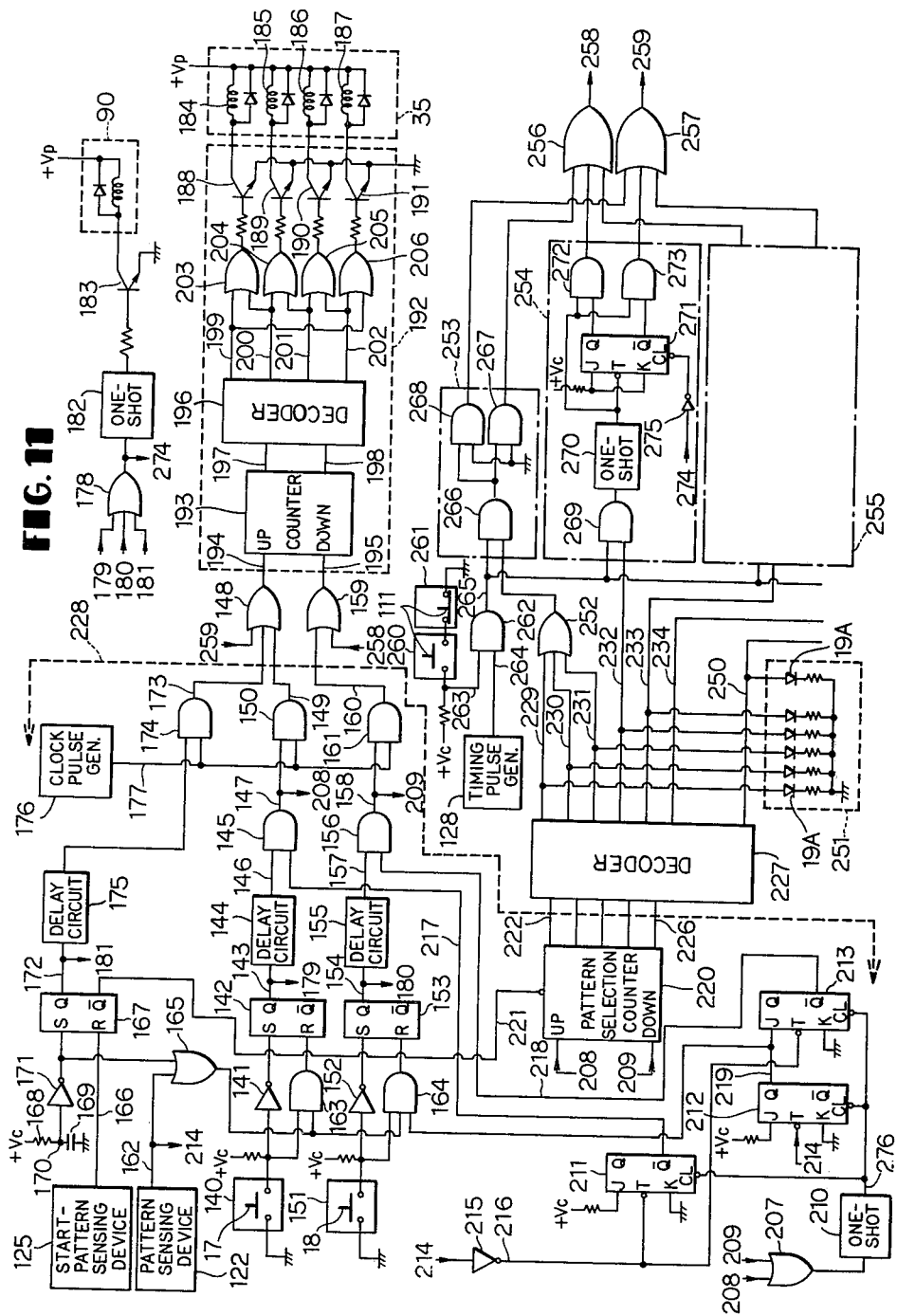
FIG. 11 is a block diagram of a control system for driving a step motor to form a selected stitch pattern in accordance with the sequence predetermined for that stitch pattern.

Referring to FIG. 11 now, a first pattern selection switch 140 closed by depression of the push button 17 is connected via an inverter 141 to a set terminal of a flip-flop 142, whose output line 143 is connected via a delay circuit 144 to an input line 146 of an AND gate 145. An output line 147 of the gate 145 is connected to an AND gate 150 having an output line 149 connected to an OR gate 148. Similarly, a second pattern selection switch 151 closed by depression of the push button 18 is connected via an inverter 152 to a set terminal of a flip-flop 153, whose output line 154 is connected via a delay circuit 155 to an input line 157 of an AND gate 156. And an output line 158 of the gate 156 is connected to an AND gate 161 having an output line 160 connected to an OR gate 159. An output line 162 of the pattern sensing device 122 is connected via on OR gate 165 to AND gates 163 and 164 connected respectively to reset terminals of the flip-flops 142 and 153. An output line 166 of the start-pattern sensing device 125 is connected to a reset terminal of another flip-flop 167, whose set terminal is connected via an inverter 171 to a junction point 170 of a resistor 168 and a capacitor 169 composing a series circuit which is connected at one end to a constant-voltage supply source Vc and is grounded at the other end. One output line 172 of the flip-flop 167 is connected via a delay circuit 175 to an AND gate 174 whose output line 173 is connected to the OR gate 148. A clock pulse generator 176 is connected via a line 177 to the other input terminals of the AND gates 150, 161 and 174. When a high-level signal is applied to each set terminal of the three flip-flops 142, 153 and 167 while a low-level signal is applied to each reset terminal thereof, a high-level output signal is produced on each of the output lines 143, 154 and 172. This output signal disappears when a high-level signal is applied to the rest terminals while a low-level signal is applied to the set terminals. The output lines 143, 154 and 172 of the flip-flops are connected respectively to three input lines 179, 180 and 181 of the OR gate 178, whose output line is connected to a one-shot multivibrator 182. This multivibrator applies its output signal to the base of a transistor 183 via a resistor so as to excite the aforementioned electromagnetic solenoid 90 temporarily.

The step motor 35 has four field coils 184 through 187 and are actuated by a driving means 192 including four transistors 188 through 191 connected to the coils individually. A counter 193 has two input lines 194 and 195 connected to the OR gates 148 and 159, and also two output lines 197 and 198 connected to a decoder 196. This counter is capable of executing decimal counting from 1 to 4 circulatively and, when counted value reaches 4, no output signal is produced on its output lines 197 and 198. Counting is so performed as to increase the value by 1 every time a high-level signal is applied to the input line 194, and to decrease the value by 1 every time a high-level signal is applied to the other input line 195. And the signal representing the counted value appears on the output lines 197 and 198. The decoder 196 has four output lines 199 through 202 and generates a high-level signal circulatively on its one output line in response to the output signal of the counter 193. The four output lines are grouped into two pairs each consisting of two adjacent lines and are connected to four OR gates 203 through 206, whose output lines are connected via resistors to the bases of the four transistors 188 through 191. Therefore, in response to the decimal counted values 1, 2, 3 and 4 of the counter 193, digital code signals "0100", "0010", "0001" and "1000" appear on the four output lines 199 through 202 of the decoder 196. And two of the four transistors 188 through 191 are turned on according to the digital code signals to drive the step motor 35, whose output shaft 36 is thereby rotated 2° per pulse signal applied to the counter 193.

The output lines 147 and 158 of the AND gates 145 and 156 are connected via lines 208 and 209 to an OR gate 207, whose output line is connected to a one-shot multivibrator 210 which applies its output signal to each clear terminal CL of three flip-flops 211, 212 and 213. Each of these flip-flops has three input terminals J, T and K, of which K is grounded. The input terminals T of the first and third flip-flops 211 and 213 are connected to an output line 216 of an inverter 215 which is connected via a line 214 to the output line 162 of the pattern sensing device 122, while the input terminal T of the second flip-flop 212 is connected directly to the output line 162. The terminals $\overline{Q}$ of the flip-flops 211 and 213 are connected via lines 217 and 218 to the AND gates 145 and 156, while the output terminal Q of the flip-flop 212 is connected via a line 219 to the input terminal J of the flip-flop 213 and also to the AND gate 164. When a low-level signal is applied to the clear terminal CL of each of these flip-flops, a high-level potential is produced at one output terminal $\overline{Q}$ while substantially no potential is produced at the other output terminal Q. And when a potential change from a high-level to a low-level occurs at the input terminal T with a high-level potential applied to each clear terminal CL and input terminal J, a high-level potential is produced at the output terminal Q while substantially no potential is produced at the output terminal $\overline{Q}$.

In a pattern selection counter 220 having a pair of input lines connected to the lines 208 and 209, its reset terminal is connected via a line 221 to the output terminal $\overline{Q}$ of the flip-flop 167, while its five output lines 222 through 226 are connected to a decoder 227. The counter 220 is capable of executing decimal counting circulatively from 1 to 22 which is the number of formable stitch patterns and, when the counted value reaches 22 or when a low-level potential is applied to the reset terminal, no high-level signal is produced at the output lines 222 through 226. Counting is so performed as to increase the value by 1 every time a high-level signal is applied to the line 208, and to decrease the value by 1 every time a high-level signal is applied to the other line 209. And the signal representing the counted value appears on the output lines 222 through 226. In FIG. 11, the left portion shown by a dotted line 228 corresponds to the pattern selection means.

The decoder 227 has twenty-two output lines 229 through 250 and generates a high-level signal circulatively on its one output line in response to the output signal of the counter 220. Each of the twenty-two output lines is connected to an anode of a light emitting diode 19A whose cathode is grounded via a resistor. The diode 19A functions as the indicating lamp 19 (FIG. 1), and constitutes indicating means 251 which cooperates with the display panel 16. In the meanwhile, the twenty-two output lines 229 through 250 are connected either directly or via an OR gate 252 to sequence circuits 253, 254, 255 and so forth related to the stitch patterns respectively. A pair of output lines of each sequence circuit are connected to OR gates 256 and 257 respectively, and output lines of the gates are connected to input lines 258 and 259 of the OR gates 159 and 148, therefore the sequence circuits constitute control means for the said driving means. Furthermore, a first switch 260 closed by depression of the aforementioned push button 111 and a second switch 261 opened only by complete depression of the button 111 compose a series circuit, which is connected at one end to a constant-voltage supply source Vc via a resistor and is grounded at the other end. One input line 263 of the AND gate 262 is connected to the junction point of the first switch 260 and the resistor, while the other input line 264 is connected to the timing pulse generator 128. And the output line 265 of the AND gate 262 is connected to the sequence circuits 253, 254, 255 and so forth.

The sequence circuit 253 comprises an AND gate 266 to receive the output signals of the AND gate 262 and the OR gate 252, and AND gates 267 and 268 whose output lines are connected to the OR gates 256 and 257 respectively. One input line of each of the AND gates 267 and 268 is connected to the output line of the AND gate 266, while the other input lines thereof are grounded. The sequence circuit 253 is activated upon selection of straight stitch. The next sequence circuit 254 for zigzag stitch comprises an AND gate 269 to receive the signal produced on the lines 232 and 265, a one-shot multivibrator 270 for generating a pulse in response to the output signal of the AND gate 269, a flip-flop 271 having an input terminal T to receive the said pulse and two input terminals J and K connected to a constant-voltage supply source Vc, and two AND gates 272 and 273 which receive the output signal from the terminal Q or $\overline{Q}$ of the flip-flop 271 and also the output signal of the one-shot multivibrator 270, wherein the output lines of the AND gates 272 and 273 are connected to the OR gates 256 and 257. The clear terminal CL of the flip-flop 271 is connected to an output line of an inverter 275 to which the output of the OR gate 178 is applied via a line 274. And when a low-level signal is applied to the clear terminal CL, a low-level potential is produced at the output terminal Q while a high-level potential is produced at the output terminal $\overline{Q}$; and when a potential change from a high-level to a low-level occurs at the input terminal T with a high-level signal applied to the clear terminal CL, the present potentials at the output terminals Q and $\overline{Q}$ are changed to the reverse levels respectively.

Figure 15:
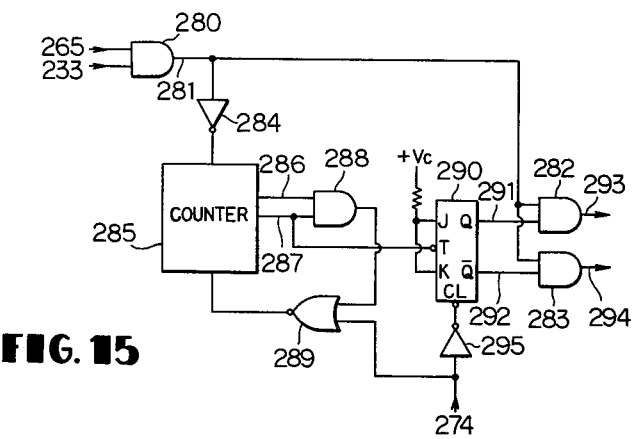
FIGS. 15, 17 and 19 are block diagrams of sequence circuits for forming three different stitch patterns.
Figure 17:
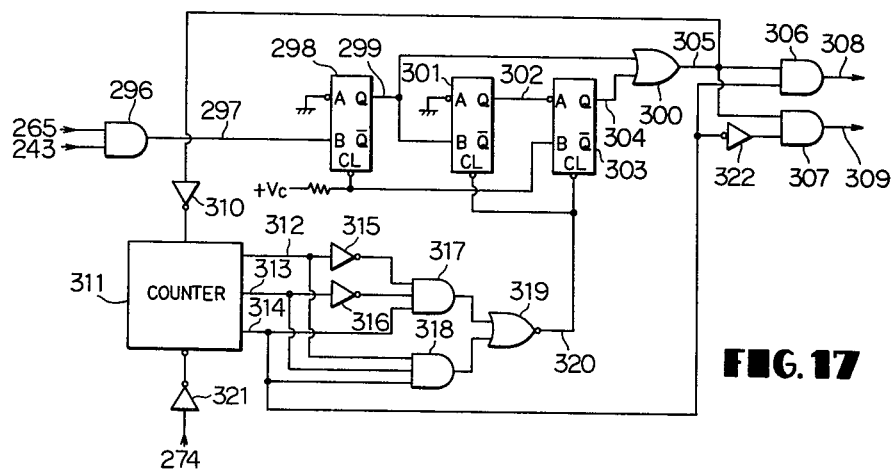
Figure 19:
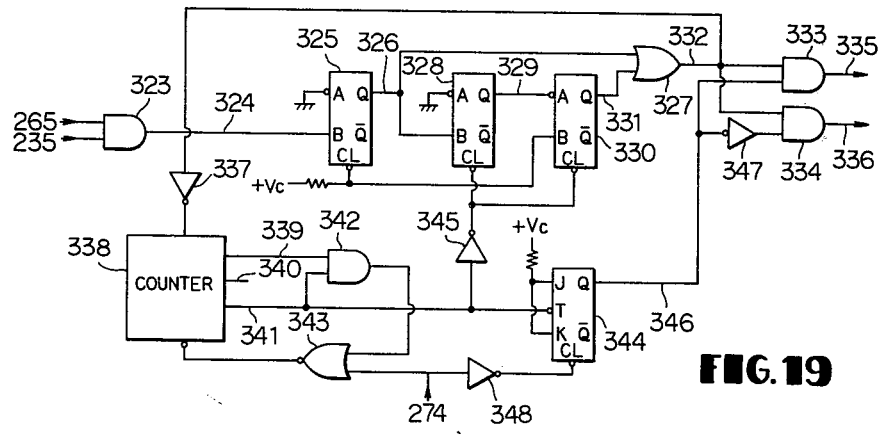

An example of the sequence circuit 255 for three-stepped zigzag stitching and also examples of other sequence circuits are shown in FIGS. 15, 17 and 19, which will be described afterward. In the embodiment of the present invention, the operation is performed as follows.

Figure 12:
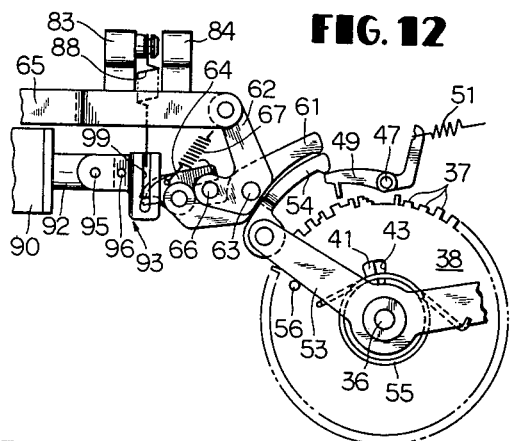
FIG. 12 is a partial front view corresponding to FIG. 2 and illustrating the operation during rotation of the cam member.

When an unshown power switch is turned on, the flip-flop 167 in FIG. 11 is set momentarily to generate a high-level signal at its output line 172, while the flip-flops 142 and 153 are reset. In response to the signal appearing on the output line 172, the one-shot multivibrator 182 generates a pulse signal, which serves to turn on the transistor 183 temporarily to excite the electromagnetic solenoid 90. Then the guide member 93 is moved leftward in FIGS. 2 and 4 with the lower ends of the helical springs 88 and 89, which are thereby disconnected operatively from the actuating pawls 64 and 71. Consequently, the contact fingers 49 and 50 are disengaged from the cam members 38 and 40 by the action of the coil springs 51 and 52. In the meanwhile, temporary excitation of the solenoid 90 causes the brake lever 106 to rotate by way of the actuating bar 94 against the elasticity of the tension spring 110, thereby releasing the brake piece 109 temporarily to render the manually operable dials 102 and 103 free. Subsequently, when the solenoid 90 is deenergized, the guide member 93 and the brake piece 109 are returned to the illustrated state by the action of the tension spring 110. However, since the helical springs 88 and 89 are respectively in the condition of natural lengths thereof, no elasticity is imparted to the actuating pawls 64 and 71, and the bent lower ends of the springs 88 and 89 are positioned above the actuating pawls 64 and 71 except when the actuating levers 83 and 84 are brought downward to the vicinity of the lowest points thereof. (Refer to FIG. 12)

Posterior to advance to such a state, the output signal of the flip-flop 167 is applied via the delay circuit 175 to the AND gate 174, which applies its output signal via the OR gate 148 to the input line 194 of the counter 193 every time a clock pulse occurs from the clock pulse generator 176. The counter 193 executes counting in response to the signal received and produces an output signal representing the counted value, and this signal is applied to the decoder 196 to generate a high-level signal on one of the output lines 199 through 202 circulatively. Then two of the field coils 184 through 187 of the step motor 35 are excited circulatively in accordance with selective turn-on of the transistors 188 through 191, so that the output shaft 36 of the step motor 35 is rotated at a rate of 2° with the cam members 38, 40 and the positioning plate 120 in response to generation of each clock pulse. When the slit 123 on the positioning plate 120 comes to be opposed to the sensor 124, the start-pattern sensing device 125 generates a high-level signal on the line 166 to reset the flip-flop 167, with the high-level signal disappearing from the line 172. Such disappearance of the signal closes the AND gate 174 to stop the step motor 35. In the state where the flip-flop 167 is set immediately after turning on the power switch, the pattern selection counter 220 is reset by a low-level signal appearing on the line 221 connected to the terminal $\overline{Q}$, so that no high-level signal or output signal appears on the lines 222 through 226. In accordance with this state, the high-level signal is produced on merely one output line 229 of the decoder 227, so that only the light emitting diode for straight stitch lights up in the indicating means 251 and simultaneously the straight-stitch sequence circuit 253 is activated. Moreover, when the step motor 35 is brought to a stop, the first and second cam members 38 and 40 are so positioned that the respective cam surfaces for straight stitch are opposed to the contact fingers 49 and 50 and also that one of the slits 119 on the positioning plate 120 is opposed to the sensor 121. The pattern sensing device 122 applies a high-level signal to the line 162 to hold the flip-flops 142 and 153 in the reset state. Thus, after turning on the power switch, the sewing machine is automatically rendered ready for straight stitch according to the above operation.

When the sewing machine is started to run in this state, straight stitching is executed in the following manner. During the first rotation of the main shaft 20, the actuating levers 83 and 84 are moved downward by the actuating cams 81 and 82 together with the helical springs 88 and 89 while maintaining a 180° angular phase difference. The bent lower ends of the helical springs are further moved downward after engaging with the actuating pawls 64 and 71 from above, thereby rotating the pawls individually against the elasticity of the weak coil springs 67 and 73 (FIG. 12) and finally reaching points below the tips of the pawls. In the second and subsequent rotations of the main shaft 20, the helical springs 88 and 89 are engaged with or disengaged from the actuating pawls 64 and 71 repeatedly in accordance with upward or downward motion of the actuating levers 83 and 84, so that the force exerted against the coil springs 51 and 52 is applied intermittently to the contact fingers 49 and 50. Therefore, the first contact finger 49 is separated farthest from the first cam member 38 by the actuating cam 81 when the needle 25 is positioned in the vicinity of its upper dead point, and the second contact finger 50 is separated farthest from the second cam member 40 when the needle 25 is positioned in the vicinity of its lower dead point. And when the needle substantially reaches the lower dead point, the shutter 126 is disconnected from the sensor 127 and the timing pulse generator 128 provides a signal pulse on the line 264. In response to this pulse, a high-level signal is applied via AND gates 262 and 266 to a pair of AND gates 267 and 268. However, since the other input lines of these AND gates are grounded, the high-level signal is not applied to the OR gates 256 and 257 at all, so that the counted value of the counter 193 remains unchanged to leave the step motor 35 undriven. Consequently, each of the contact fingers 49 and 50 is repeatedly, engaged with or disengaged from the single cam surface for the straight stitch pattern A shown in the table of FIG. 10, and thus straight stitching is executed. During this straight stitch mode, disengagement of the contact fingers 49 and 50 from the cam members 38 and 40 is not transmitted to the connection arms 62 and 69 for the aforementioned reason, so that the needle bar gate 27 and the feed regulator 31 are held stably at the same positions without any idle motion. In the state where the first contact finger 49 is engaged with the straight-stitching cam surface, as shown in FIG. 2, the back surfaces of the contact finger 49 and the motion transmitting arm 54 are coincident with the curved surface whose radial center is at the axis of the motor output shaft 36. Therefore, when the first manually operable dial 102 is rotated to displace the motion transmitting arm 54 from the position shown in FIG. 2, the first actuating arm 61 is not rotated, so that the needle bar gate 27 remains unmoved and the needle 25 penetrates through the work fabric at the same lateral position. On the other hand, in the state where the second contact finger 50 is engaged with the straight-stitching surface, as shown in FIG. 4, the back surface of the contact finger 50 is so constructed that the distance of the back surface from the axis of the motor output shaft 36 is shortened as the back surface approaches the support shaft 47. Due to such a structure, when the second manually operable dial 103 is rotated to displace the motion transmitting arm 58 rightward from the position shown in FIG. 4, the second connection arm 69 is rotated by way of the actuating arm 68 to rotate the feed regulator 31 in the manner to decrease the feeding motion imparted to the work fabric by the feed dog 29. Thus, straight stitching with a desired feed length is rendered possible by manipulation of the dial 103.

Figure 13:
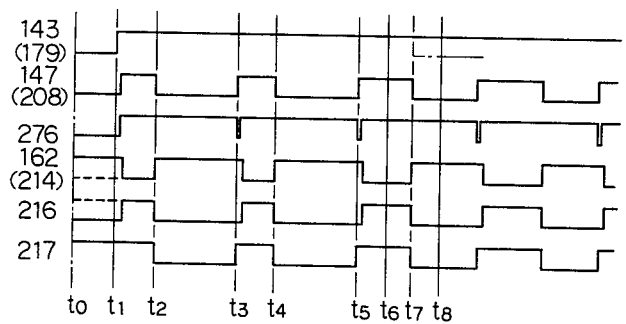
FIGS. 13 and 14 are time charts for explaining the operation of pattern selector means in the block diagram of FIG. 11.

Selection of other stitch pattern is performed as follows. The time chart of FIG. 13 illustrates changes of signals appearing on the lines 143, 147, 276, 162, 216 and 217 according to operation of the pattern selection switch 140, in which the foregoing straight stitch mode is indicated at a time point t0. When the pattern selection switch 140 is closed at a time point $t_1$ by depression of the push button 17, the flip-flop 142 is set to produce a high-level signal on the line 143, and this signal is present continuously during at least the depression of the push button 17. Since a high-level signal is produced on the line 217 connected to the output terminal $\overline{Q}$ of the flip-flop 211, the high-level signal appears with a slight delay on the output line 147 of the AND gate 145 and is further applied via the line 208 to the pattern selection counter 220. Then the counted value of this counter becomes decimal 1 to produce a high-level signal on the output line 230 alone via the decoder 227. The signal appearing on the output line 147 is applied via the OR gate 207 to the one-shot multivibrator 210, which provides a high-level signal on its output line 276 for a fixed period. Subsequently, output signals are produced from the AND gate 150 sequentially in response to a train of pulses occurring from the clock pulse generator 176 and are applied via the OR gate 148 to the counter 193, whose counted value are thereby increased sequentially. As a result, the step motor 35 is actuated by the driving means 192 to rotate its output shaft 36 counterclockwise in FIG. 9 at a rate of 2° per pulse of the clock pulse generator 176. At this time, the output signal appearing on the output line 143 of the flip-flop 142 is applied via the line 179 to the OR gate 178, so that the electromagnetic solenoid is temporarily excited as at the aforementioned initial turn-on of power supply, and the contact fingers 49 and 50 are disengaged from the cam members 38 and 40 respectively. The high-level signal on the output line 162 of the pattern sensing device 122 once disappears with rotation of the positioning plate 120, but when the next one of the slits 119 comes to be opposed to the sensor 121 at a time point t2, a high-level signal is produced again on the output line 162. This signal is applied via the line 214 to the inverter 215, thereby causing a potential change on the output line 216 from a high level to a low level, with the signal disappearing from the output line 217 of the flip-flop 211. Thus, the signal on the output line 147 of the AND gate 145 also disappears therefrom to interrupt signal application to the input line 194 of the counter 193 so that the step motor is brought to a stop temporarily. However, when the high-level signal on the output line 276 of the one-shot multivibrator 210 disappears at a time point t3, a high-level signal appears again on the output line 217 of the flip-flop 211, and another high-level signal is produced also on the output line 147 of the AND gate 145, thereby driving the step motor 35 again while enabling the one-shot multivibrator 210 to apply a new pulse immediately to the line 276. And in the same manner as in the preceding case, the signal having once disappeared from the output line 162 of the pattern sensing device 122 is produced thereon again at a time point t4, and the signal potential on the output line 217 of the flip-flop 211 is changed to a low level to bring about disappearance of the signal on the output line 147 of the AND gate 145. The signal changes occurring on the individual lines at the time point t4 are the same as those at the time point t2, and such signal changes between t2 and t4 are repeated during depression of the push button 17 to increase the counted value of the pattern selection counter 220 sequentially, so that the decoder 227 produces high-level signals circulatively on one of its output lines.

Accordingly, when the operator desires to execute zigzag stitching, the desired mode is obtained by releasing the push button 17 from depression upon lighting of the indicating lamp 19 located above the zigzag stitch symbol on the display panel 16 of FIG. 1. The lighting position of the indicating lamp 19 is shifted when a signal potential change occurs on the line 147 (FIG. 13) from a low level to a high level. Assuming now that the indicating lamp above the zigzag stitch symbol lights up at a time point t5 and the push button 17 is released from depression at a time point t6, the step motor 35 is driven until disappearance of the high-level signal from the output line 147 of the AND gate 145, that is, until appearance of the next pulse signal on the line 162 from the pattern sensing device 122. And at a time point t7, the flip-flop 142 is reset by the output signal of the AND gate 163 produced in response to generation of a high-level signal from the pattern sensing device 122, and simultaneously signal application from the flip-flop 211 to the AND gate 145 is interrupted to stop the step motor 35. If the push button 17 is released from depression at a time point t8, it is obvious from FIG. 13 that the step motor 35 is brought to a stop immediately. When the motor is at a stop, the cam members 38 and 40 are opposed respectively to the contact fingers 49 and 50 at the cam surfaces having radiuses which are listed in the upper row of the column for the zigzag stitch pattern B in FIG. 10. And since three pulses are applied via the input line 208 to the pattern selection counter 220, the decoder 227 provides a high-level signal on its fourth output line 232 to activate the zigzag-stitching sequence circuit 254.

When the sewing machine is run subsequently, as in the foregoing case, the helical springs 88 and 89 return to the operative positions with respect to the actuating pawls 64 and 71 within the first rotation of the main shaft 20, and then the contact fingers 49 and 50 are engaged with or disengaged from the cam members 38 and 40. In the meanwhile, the timing pulse generator 128 generates a pulse every time the needle 25 substantially reaches its lowest point during the running of the sewing machine. At the time of the aforementioned pattern selection, the high-level signal is already applied to the clear terminal CL of the flip-flop 271 in the sequence circuit 254 after the low-level signal is once applied thereto. Accordingly, when the first pulse is obtained from the timing pulse generator, the AND gate 273 produces on output signal immediately in response to generation of the pulse from the one-shot multivibrator 270, and this output signal is applied via the OR gates 257 and 148 to the counter 193, so that the step motor 35 is driven to rotate its output shaft 36 by 2° counterclockwise. And upon disappearance of the pulse applied from the one-shot multivibrator 270, potential levels are reversed at the output terminals Q and $\overline{Q}$ of the flip-flop 271, so that a high-level potential is obtained at the output terminal Q. Therefore, when the next pulse occurs from the timing pulse generator 128, the AND gate 272 immediately produces an output signal which is then applied via the OR gates 256 and 159 to the counter 193, thereby driving the step motor 35 to rotate its output shaft 36 by 2° clockwise contrary to the preceding direction. The output of the flip-flop 271 is inverted upon disappearance of the pulse occurring from the one-shot multivibrator 270, and when the third pulse is produced from the pulse generator 128, the output signal of the AND gate 273 is applied via the OR gates 257 and 148 to the counter 193, thereby rotating the output shaft 36 of the step motor 35 by 2° counterclockwise. Subsequently, bidirectional rotation of the output shaft 36 is repeated during the running of the sewing machine to cause forward and backward rotation of the second cam member 40 secured to the output shaft. When this shaft is rotated, that is, when the pulse signal is produced from the timing pulse generator 128, the needle 25 is positioned substantially at its lowest point with the feed dog 29 being under the top surface of the bed 12. At this time, the first contact finger 49 is pressed to the first cam member 38 by the action of helical spring 88 while the second contact finger 50 is disengaged from the second cam member 40 by the action of coil spring 52. Accordingly, when the step motor 35 is driven to rotate its output shaft 36 during the running of the sewing machine, the second cam member 40 rotates together with the output shaft but the first cam member 38 is not rotatable and remains at a stop against the elasticity of the torsion spring 45 or 46. Relative rotation of the second cam member 40 to the first cam member 38 is permitted by the through holes 43 and 44 formed in the two cam members 38 and 40, the intermediate member 42 having the lug portion 41 fitted into the two through holes, and also by the torsion springs 45 and 46. When the output shaft 36 of the step motor 35 is rotated counterclockwise in FIGS. 4 and 9, the second cam member 40 alone is rotated against the elasticity of the torsion spring 45 while the first cam member 38 and the intermediate member 42 are held at a stop. To the contrary, when the output shaft 36 is rotated clockwise, the second cam member 40 is rotated together with the intermediate member 42 against the elasticity of the torsion spring 46 while the first cam member 38 alone is held at a stop. With subsequent upward motion of the needle 25, the first contact finger 49 is released from the action of helical spring 88 and is disengaged from the first cam member 38. Then this cam member is rotated by the action of torsion spring 45 or 46 to obtain the state of FIGS. 2 and 4 where the lug portion 41 of the intermediate member 42 is in engagement with the through holes 43 and 44 of the two cam members. There is a slight difference in the time point of disengagement of the contact finger 49 from the cam member 38 depending on the height of the cam surface thereof. However, since the actuating cams 81 and 82 are secured to the main shaft 20 with a 180° angular phase difference as mentioned already, the difference in the time points of rotation of the cam members 38 and 40 is approximately 180° with respect to the angle of rotation of the main shaft.

As described in detail hereinabove, utilizing that the two contact fingers 49 and 50 are alternately engaged with or disengaged from the cam members 38 and 40 synchronously with rotation of the main shaft 20, the two cam members are rotated clockwise and counterclockwise at a rate of 2° by a single step motor 35 with a substantially fixed phase difference maintained between them, thereby performing the zigzag stitching. In this mode, the stitching amplitude and feed length are optionally changeable by manually operating the first and second dials 102 and 103. It is apparent from the above description that a zigzag stitch pattern is formed with the maximum stitching amplitude and feed length in case the dials are not operated at all. The positions of the individual components shown in FIGS. 2 through 8 illustrate the state immediately before penetration of the needle through the work fabric in the straight stitch mode, and the foregoing description relates to the operation performed in the case of selecting the zigzag stitch mode in such state. The recent sewing machines for home use are mostly equipped with a device for stopping the needle at a predetermined position, wherein the needle is positioned substantially at its highest point when the sewing machine is at a stop. It is possible also in the embodiment of this invention to stop the sewing machine with the needle positioned substantially at its highest point by utilizing the pulse signal obtained from the positioning pulse generator 131 (FIG. 3). Since such a device is not related to this invention directly, its concrete structure is omitted here. If the zigzag stitch mode is selected in the state where the needle 25 is positioned substantially at its highest point, due to the reason that the actuating lever 83 is at the lowest position, the bent lower end of the helical spring 88 is located below the tip of the actuating pawl 64 at the termination of exciting the electromagnetic solenoid 90. Therefore, with start of running the sewing machine, the contact finger 49 receives the elasticity of helical spring 88 from the first rotation of the main shaft 20, so that the cam surface of the cam member 38 immediately affects stitching from the beginning in formation of the first stitch. However, the feed length anterior to formation of the first stitch is affected by the cam surface with which the contact finger 50 was in engagement immediately before the stop of the sewing machine. And when the contact finger 49 is disengaged from the cam member 38 in the running of the sewing machine, there occurs no lateral displacement of the needle 25 as mentioned before.

Hereinafter non-ravel seaming and reverse stitching will be described with reference to FIGS. 4, 9 and 11. When the push button 111 is depressed slightly during the zigzag stitch mode, the contact finger 50 is moved backward along the support shaft 47 and is engaged intermittently with the cam member 118 secured to the regulated member 57. The first switch 260 (FIG. 11) is closed simultaneously with the displacement of the contact finger 50, and the high-level signal that has been present on the line 263 disappears to interrupt application of the pulse signal, which is obtained in response to the pulse from the timing pulse generator 128, to the output line 265 of the AND gate 262, that is, to one input line of the AND gate 269. Consequently, the rotating of output shaft 36 of the step motor 35 is brought to a stop and the contact finger 49 is engaged intermittently with the same cam surface of the cam member 38. Thus, non-ravel seaming is executed with the needle position corresponding to the said cam surface and also with the fine feed length and backward feed corresponding to the cam member 118. In this case, a fixed backward feed motion is imparted to the work fabric independently of the position of the regulated member 57 displaced by the dial 103. When the push button 111 is depressed completely, the contact finger 50 is moved further backward to be engaged intermittently with the cam surface 117 of the regulated member 57. The second switch 261 is opened simultaneously with motion of the contact finger 50, so that a high-level signal obtained in response to the pulse from the timing pulse generator 128 is applied again to the AND gate 269 in the sequence circuit 254, thereby rotating the output shaft 36 of the step motor 35 clockwise and counterclockwise in the aforementioned manner. And thus the zigzag stitching is executed with the backward feed, whose length is determined depending on the position of the contact finger 50 engaged with the cam surface 117. In this embodiment, the work fabric is fed at the backward feed length equivalent to the forward feed length established by manipulation of the dial 103.

With respect to the stitch pattern C illustrated in FIG. 10, six stitches are required to form a single piece of this pattern. However, it is rendered not necessary to provide six cam surfaces for the six stitches by shaping four cam surfaces on the first cam member 38 and rotating this cam member in a stepping way according to the sequence shown in the final column of FIG. 10, hence enabling omission of two cam surfaces. If the push button 17 is released after continuous depression to light up the indicating lamp 19 above the symbol for the stitch pattern C on the display plate 16 of FIG. 1, the contact fingers 49 and 50 are opposed to the cam surfaces shaped on the cam members 38 and 40 within angular ranges of 10° to 12° thereof, and the sequence circuit of FIG. 15 is activated. In case a high-level signal from the pattern sensing device 122 appears on the line 162 immediately anterior to the operation for selecting the stitch pattern C, the signal processing described with reference to FIG. 13 is presented upon depression of the push button 17. However, in case the high-level signal from the pattern sensing device 122 is absent on the line 162, signals as shown in FIG. 13 by dotted lines are produced on the lines 162 and 216 substantially between time points $t_0$ and $t_1$, and the subsequent signal-processing is exactly the same as the aforementioned.

The sequence circuit of FIG. 15 will now be described briefly. One input terminal of an AND gate 280 is connected to the output line 265 of the AND gate 262 shown in FIG. 11, while the other input terminal thereof is connected to one output line 233 of the decoder 227. An output line 281 of the AND gate 280 is connected to one input terminal of each of AND gates 282 and 283, and also to an input terminal of a counter 285 via an inverter 284. Two output lines 286 and 287 of the counter 285 are connected to an AND gate 288, whose output is connected via a NOR gate 289 to the reset terminal of the counter 285. This counter is capable of executing decimal counting from 1 to 3 circulatively and, when the counted value reaches 3, an input responsive to the high-level signal from the AND gate 288 is applied to the reset terminal of the counter so that the output signals disappear from the output lines 286 and 287. One input terminal T of a flip-flop 290 is connected to one output line 287 of the counter 285, while other input terminals J and K are connected to a constant-voltage supply source Vc. This flip-flop 290 functions in the same manner as the flip-flop 271 in the sequence circuit 254. A pair of output terminals Q and $\overline{Q}$ of this flip-flop are connected via lines 291 and 292 to the other input terminals of the AND gates 282 and 283, whose outputs are applied via lines 293 and 294 to a pair of OR gates 256 and 257 shown in FIG. 11. And the output signal of the OR gate 178 shown in FIG. 11 is applied to the NOR gate 289 directly and also to the clear terminal CL of the flip-flop 290 via an inverter 295.

Figure 16:
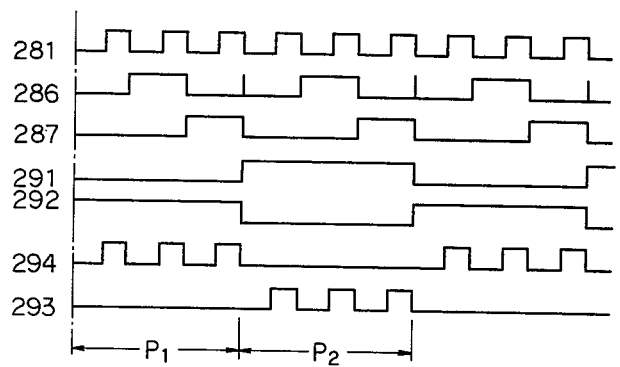
FIGS. 16, 18 and 20 are time charts for explaining the operations of the sequence circuits shown in FIGS. 15, 17 and 19 respectively.

When the sewing machine is run to form the stitch pattern C, a pulse signal of FIG. 16 appears on the output line 281 of the AND gate 280 in response to the timing pulse occurring from the pulse generator 128. And in relation to this pulse signal, output signals of FIG. 16 are produced respectively on the output lines 286 and 287 of the counter 285 and also on the output lines 291 and 292 of the flip-flop 290. Therefore, during a period P1 shown in FIG. 16, three pulses appear on the output line 294 of the AND gate 283 in response to the pulse signal obtained from the AND gate 280; and during a period P2, three pulses appear on the output line 293 of the AND gate 283. Thus, two pulse groups each consisting of three appear alternately on the output lines 294 and 293 in response to the pulses from the timing pulse generator 128. Consequently, two input signal groups each consiting of three are applied alternately to the counter 193 of FIG. 11 via the input lines 194 and 195 in response to the said two pulse groups, thereby driving the step motor 35 to repeat three-step counterclockwise rotation of its output shaft 36 and three-step clockwise rotation thereof alternately. And the two cam members 38 and 40 are rotated with the aforementioned phase timing in relation to such driving of the step motor 35 to form the stitch pattern C.

Regarding the stitch pattern D of FIG. 10, five stitches are required to form a single piece of this pattern. Supposing now that five cam surfaces corresponding to such five stitches are arranged according to the stitching sequence within an angular range from 138° to 148° of the two cam members, formation of the first through fifth stitches to compose a single stitch pattern D can be achieved by driving the step motor 35 to rotate its output shaft 36 in one direction intermittently at a rate of 2° per step. However, in forming a plurality of stitch patterns D continuously with the aforementioned arrangement of the cam surfaces, it becomes necessary to drive the step motor to rotate the output shaft 36 in the other direction by 10° at a single step after completion of the fifth stitch of the first pattern so as to form the first stitch of the next pattern. And for attaining such a large-angle rotation per step of the motor output shaft within a short time, remarkably excellent performance is required of the step motor. In the conventional sewing machines for home use, usually the main shaft is driven at a speed of 1,000 revolutions or so per minute and, considering the up-and-down motion of the contact fingers 49 and 50, the output shaft of the step motor should be rotated within 0.03 seconds per step. The requirement of such a high response speed is excessively severe for the step motor of small dimensions installable within the sewing machine frame, and practically it is almost impossible to meet the requirement.

In this embodiment, the step motor 35 is driven according to the sequence of FIG. 10 to rotate its output shaft 36 by a maximum of 4° per step. With respect to five stitches composing a single stitch pattern D, five cam surfaces within an angular range from 138° to 148° of each cam member are arranged sequentially to correspond to the first, fifth, second, fourth and third stitches, and the sequence circuit of FIG. 17 is employed to control the driving of the step motor 35. In FIG. 17, one input terminal of an AND gate 296 is connected to an output line 265 of the AND gate 262 shown in FIG. 11, while the other input terminal thereof is connected to one output line (e.g. 243) of the decoder 227. An output line 297 of the AND gate 296 is connected to an input terminal B of a first one-shot multivibrator 298 whose input terminal A is grounded, and a pulse output produced at the output terminal Q of this multivibrator is applied via a line 299 to an OR gate 300. An input terminal B of a second one-shot multivibrator 301, whose input terminal A is grounded, is connected to an output terminal Q of the first one-shot multivibrator 298. The pulse output of the multivibrator 301 is applied via a line 302 to an input terminal A of a third one-shot multivibrator 303, which then applies an output from its output terminal Q to the OR gate 300 via a line 304. Both the clear terminal CL of the first multivibrator 298 and the input terminal B of the third multivibrator 303 are connected via a resistor to a constant-voltage supply source Vc respectively. An output line 305 of the OR gate 300 is connected to one input terminal of each of AND gates 306 and 307, whose outputs are applied via lines 308 and 309 to the OR gates 256 and 257 shown in FIG. 11. The output signal of the OR gate 300 is applied via an inverter 310 to a counter 311 having three output lines 312 through 314, of which two lines 312 and 313 are connected via inverters 315 and 316 to an input line of an AND gate 317, while another output line 314 is connected directly to the input line of the AND gate 317. Signals produced on the three output lines 312 through 314 are applied also to another AND gate 318, and the output signals of both AND gates 317 and 318 are applied to a NOR gate 319, whose output line 320 is connected to the clear terminals CL of the one-shot multivibrators 301 and 303. A signal produced on the output line 314 of the counter 311 is applied directly to the AND gate 306, while being applied via an inverter 322 to the AND gate 307. The counter 311 is capable of executing decimal counting from 1 to 8 circulatively and, when the counted value reaches 8, no output signal is produced on its output lines 312 through 314. The reset terminal of the counter 311 is connected on an output line of an inverter 321 which receives via a line 274 the output of the OR gate 178 shown in FIG. 11, and when a potential change occurs at the reset terminal from a high level to a low level, the counter 311 is reset so that no output signal is produced on the output lines 312 through 314 thereof. All the three one-shot multivibrators 298, 301 and 303 function exactly in the same manner. During application of a low-level signal to the clear terminal CL or the input terminal B of each multivibrator and also during application of a high-level signal to the input terminal A thereof, a low-level potential is produced at the output terminal Q so that no output pulse is obtained therefrom. However, if a potential change occurs at the input terminal B from a low level to a high level during application of a high-level signal to the clear terminal CL and also application of a low-level signal to the input terminal A, a pulse signal of a fixed duration is generated at the output terminal Q. And if a potential change occurs at the input terminal A from a high level to a low level during application of a high-level signal to the clear terminal CL, a pulse signal of a fixed duration is generated at the output terminal Q.

Figure 18:
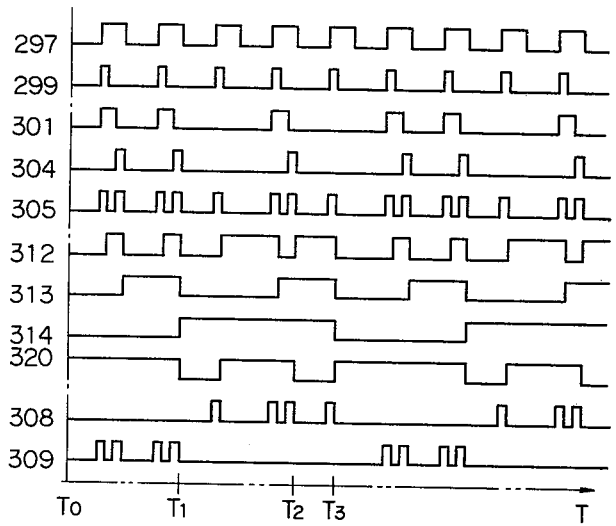

FIG. 18 shows a time chart which, in relation to the said sequence circuit, illustrates changes of signals appearing respectively on the output lines 299, 302 and 304 of the three one-shot multivibrators, output line 305 of the OR gate 300, output lines 312 through 314 of the counter 311, output line 320 of the NOR gate 319, and also on the output lines 308 and 309 of the two AND gates 306 and 307 when pulse signals are produced on the output line 297 of the AND gate 296 in response to application of the timing pulses. As is apparent from this time chart, each output pulse of the one-shot multivibrators 298 and 303 has a small duration, while each output pulse of another one-shot multivibrator 301 has a relatively large duration. And after start of running the sewing machine posterior to the operation of selecting the stitch pattern D, pulse signals appear on the output line 297 of the AND gate 296 in response to application of timing pulses from the pulse generator 128, and output pulses appear on the output line 305 of the OR gate 300 in relation to the pulse signals on the line 297. And when the counted value of the counter 311 reaches decimal 4 and 7 at time points T1 and T2 where the forth and seventh output pulses on the line 305 disappear respectively, the signal potential on the output line 320 of the NOR gate 319 changes from a high level to a low level. Therefore, no output pulse is produced from the two one-shot multivibrators 301 and 303 immediately after the time points T1 and T2. And a pulse signal responsive to the output signal of the OR gate 300 appearing on the line 305 is produced from either the AND gate 306 or 307 in relation to the level change of the signal appearing on the third output line 314 of the counter 311. In other words, during the period between a time point T0 where the sewing machine is started to run and a time point T1 where the counted value of the counter 311 reaches decimal 4, the step motor 35 is so driven as to cause two-step counterclockwise rotation of its output shaft 36 in response to the pulse signal produced on the line 309 of the AND gate 307. It is apparent that the angle of rotation of the output shaft 36 is 4° per step. During the next period between T1 and T3, the step motor 35 is so driven as to cause three-step clockwise rotation of the output shaft 36 in response to the pulse signal produced on the line 308 of the AND gate 306. It is understood from the pulse signals appearing on the lines 308 and 309 in FIG. 18 that the angle of clockwise rotation of the output shaft is 2° in the first step, 4° in the second step, and 2° in the third step. And the step motor 35 repeats the foregoing action posterior to the time point T3.

Due to the above-described drive of the step motor 35 and the alternate vertical motion of the contact fingers 49 and 50 synchronized with rotation of the main shaft, the two cam members 38 and 40 are rotated with a fixed phase timing according to the sequence shown in FIG. 10, so that a plurality of stitch patterns D are formed continuously during the running of the sewing machine.

Regarding the stitch pattern E of FIG. 10, six stitches are required to form a single piece of this pattern. Therefore, six cam surfaces with stitching information recorded thereon individually are shaped within an angular range from 18° to 30° of the cam members 38 and 40 in an arrangement corresponding to the first, sixth, second, fifth, third and fourth stitches. And the sequence circuit of FIG. 19 is employed as a control circuit which is activated upon selection of the stitch pattern E and controls the driving of the step motor according to the sequence illustrated in the columns of stitch patterns E, F and G in FIG. 10.

In FIG. 19, one input terminal of an AND gate 323 is connected to an output line 265 of the AND gate 262 shown in FIG. 11, while the other input terminal thereof is connected to one output line (e.g. 235) of the decoder 227. An output line 324 of the AND gate 323 is connected to an input terminal B of a first one-shot multivibrator 325 whose input terminal A is grounded, and a pulse output produced at its output terminal Q is applied via a line 326 to an OR gate 327. An input terminal B of a second one-shot multivibrator 328, whose input terminal A is grounded, is connected to an output terminal Q of the first one-shot multivibrator 328. A third one-shot multivibrator 330 has an input terminal A to receive the pulse output of the first one-shot multivibrator 328 via a line 329, and applies an output from its output terminal Q to the OR gate 327 via a line 331. Both the clear terminal CL of the first multivibrator 325 and the input terminal B of the third multivibrator 330 are connected via a resistor to a constant-voltage supply source Vc respectively. An output line 332 of the OR gate 327 is connected to one input terminal of each of AND gates 333 and 334, whose outputs are applied via lines 335 and 336 to the OR gates 256 and 257 shown in FIG. 11. The output signal of the OR gate 327 is applied via an inverter 337 to a counter 338 having three output lines 339 through 341, of which first and third lines 339 and 341 are connected to input terminals of an AND gate 342 whose output signal is applied via a NOR gate 343 to the reset terminal of the counter 338. An output signal appearing on the third output line 341 of this counter is applied to an input terminal T of a flip-flop 344 directly and also to each clear terminal CL of the one-shot multivibrators 328 and 330 via an inverter 345. The other input terminals J and K of the flip-flop 344 are connected to a constant-voltage supply source Vc via a resistor, and a signal appearing on a line 346 connected to the output terminal of the flip-flop 344 is applied to the AND gate 333 directly and also to the AND gate 334 via an inverter 347. And the output signal of the OR gate 178 in FIG. 11 is applied to the input terminal of the NOR gate 343 directly and also to the clear terminal CL of the flip-flop 344 via an inverter 348. The counter 338 is capable of executing decimal counting from 1 to at least 5 and, when the counted value reaches 5 to obtain a digital code signal "101" on its three output lines 339 through 341, the counter is reset immediately to produce an output digital "000". As regards the mode of function, the three one-shot multivibrators 325, 328 and 330 are exactly the same as the multivibrators 298, 301 and 303 of FIG. 17, and the flip-flop 344 is exactly the same as the flip-flop 271 of FIG. 11.

Figure 20:
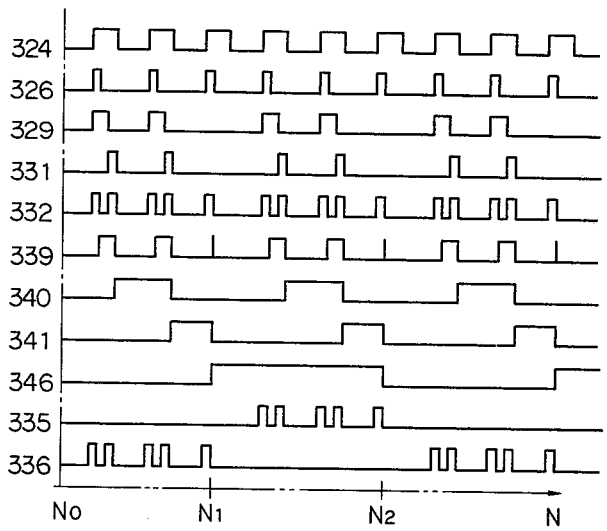

FIG. 20 shows a time chart which, in relation to the sequence circuit of FIG. 19, illustrates changes of signals appearing respectively on the output lines 326, 329 and 331 of the three one-shot multivibrators, output line 332 of the OR gate 327, output lines 339 through 341 of the counter 338, output line 346 of the flip-flop 344, and also on the output lines 335 and 336 of the AND gates 333 and 334 when pulse signals are produced on the output line 324 of the AND gate 323 in response to application of the timing pulses. As is obvious from this time chart, during the period between a time point No where the sewing machine is started to run posterior to selection of the stitch pattern E and a time point N1 where the counted value of the counter 338 reaches decimal 5, the step motor 35 is driven in response to the pulse signal produced on the output line 336 of the AND gate 334 and causes three-step counterclockwise rotation of its output shaft 36. And in the next period from N1 to N2, the step motor is driven sequentially in response to the pulse signal produced on the line 335 of the AND gate 333 and causes three-step clockwise rotation of the output shaft 36. It is fully understood from FIG. 20 that the angle of clockwise and counterclockwise rotation of the output shaft 36 is 4° in the first and second steps, and 2° in the third step. And the step motor 35 repeats the foregoing action posterior to the time point N2. Consequently, the cam members 38 and 40 are rotated according to the sequence shown in the column of stitch pattern E in FIG. 10, so that a plurality of the patterns E are formed continuously during the running of the sewing machine.

It is apparent that stitch pattern F or G of FIG. 10 can be formed in the same manner as in the preceding case of stitch pattern E by utilizing the sequence circuit of FIG. 19. With respect to formation of stitch patterns each consistig of six or more stitches, it will be understood that any stitch pattern consisting of odd stitches is achievable by driving the cam members 38 and 40 according to a sequence similar to the one used in forming the stitch pattern D, and any stitch pattern consisting of even stitches is achievable by driving the cam members according to a sequence similar to the one used in forming the stitch pattern E.

Figure 14:
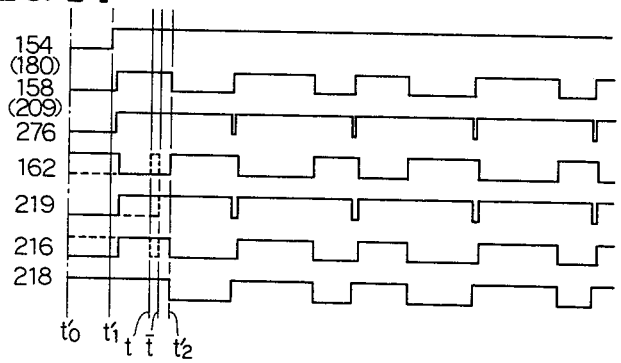

Finally, with reference to FIGS. 11 and 14, an explanation will be given on the operation performed in selecting a stitch pattern by depression of a push button 18. In the stitch pattern selection effected by depressing the aforementioned push button 17, a pulse signal is applied intermittently to the counter 193 via the line 194, and the step motor 35 is so driven as to rotate its output shaft 36 counterclockwise in accordance with increase of the counted value of this counter. And in the meanwhile, another pulse signal is applied to the pattern selection counter 220 via the line 208, and the position of the lighted indicating lamp 19 in FIG. 1 is shifted leftward in accordance with increase of the counted value. However, when the push button 18 is depressed, the step motor 35 is so driven as to rotate its output shaft 36 clockwise contrary to the above, and the position of the lighted indicating lamp 19 is shifted rightward. The time chart of FIG. 14 illustrates changes of signals appearing in the latter case on the lines 154, 158, 276, 162, 219, 216 and 218 respectively. How the pattern selection is carried out by depressing the push button 18 will be understood easily with reference to FIG. 14. It is to be noted, however, that the pattern selecting operation is somewhat different depending on whether the signal on the output line 162 of the pattern sensing device 122 is at a high level or a low level immediately before depression of the push button 18. That is, when this button is depressed in the state where one of the slits 119 on the positioning plate 120 of FIG. 9 is opposed to the sensor 121, there occur such signal changes that are shown by solid lines in FIG. 14. And in any other case, signal changes shown by dotted lines occur on the lines 162, 219 and 216 at time points in the vicinity of starting the depression of push button 18. It is based on the grounds that after the output shaft 36 of the step motor 35 begins clockwise rotation with the positioning plate 120, first the slit 119 corresponding to the previously selected stitch pattern comes to be opposed to the sensor 121 and then a pulse signal appears on the output line 162 of the pattern sensing device 122 at a time point t. Assuming now that the signal on the line 158 changes in response to generation of the said pulse signal, it follows therefrom that this signal on the line 158 changes from a high level to a low level at the time point t and changes again to resume a high level at a time point t̄. Consequently, two pulse signals come to appear on the line 158 between time points t'1 and t'2, thereby bringing about non-coincidence between the stitch pattern corresponding to the rotational positions of the cam members 38 and 40 and the stitch pattern indicated by the lighted lamp 19. In the block diagram of FIG. 11, two flip-flops 212 and 213 are employed to avoid such disadvantages.

In the embodiment of this invention described hereinabove, the second cam member 40 is secured to the output shaft 36 of the step motor 35, while the first cam member 38 is fitted loosely thereto. But the structure may be modified to the contrary that the first cam member 38 is secured while the second cam member 40 is fitted loosely. In this case, however, the mechanism needs to be so composed that the first cam member 38 is rotated by the step motor 35 when the first contact finger 49 is disengaged therefrom.

As can be seen clearly in FIG. 10, a group of stepped cam surfaces corresponding to each stitch pattern is respectively formed in an individually independent region on the pair of cam members 38 and 40. It is also permissible, however, some stitch patterns are formed overlappingly with other pattern crossing the region border, which means a certain stepped cam surface is utilized by two different stitch patterns concurrently. As the maximum rotation angle per step of the output shaft 36 of the step motor 35 is 4°, the both cam members 38 and 40 only need to be relatively, clockwise and counterclockwise, rotatable at least 4° respectively. Furthermore, each stepped cam surface of the cam members 38 and 40 may be formed flat, not being necessitated to be formed as a part of cylindrical surface having a radius about the axis of the output shaft 36 of the step motor 35. Although the step motor 35 is always excited, which excitation may be interrupted on condition that the second cam member 40 has been rotated to come into engagement with the contact finger 50. Additionally speaking, as an information carrying member a magnetic or optical information recording member, in place of the cam member in this embodiment, may be employed.

As is obvious from the above description, the present invention is not limited to the illustrated embodiment alone, but a variety of modifications can be implemented without departing from the spirit thereof.

What is claimed is:

1. In a regulating system of a sewing machine, which is provided with stitch forming instrumentalities, responsive to pattern information for regulating at least one of said stitch forming instrumentalities including:

at least one information-carrying member (38 and/or 40) having a plurality of pieces of pattern information recorded thereon for forming a plurality of stitch patterns;

scanning means (49 and/or 50) for selectively picking up the pattern information from said information-carrying member upon the relative rotation of said at least one information-carrying member relative to said scanning means;

a step motor (35) operatively connected to said at least one information-carrying member for rotating said at least one information-carrying member;

drive means (192) responsive to control signals applied thereto for driving said step motor selectively in forward and reverse directions;

the improvement comprising:

wherein said at least one information carrying member on which said pattern information is recorded contains information in the form of an information group for each stitch pattern within each of defined regions on said information-carrying member, each pattern information in one of said groups being so arranged as to make it possible to be sequentially picked up at least once by said scanning means upon one reciprocating rotation, within one of said defined regions, of said at least one information-carrying member relative to said scanning means;

control means (253-255) for applying said control signals to said drive means for intermittently rotating said at least one information-carrying member in timed relation with said sewing machine, according to individually predetermined sequences for each stitch pattern and for said one reciprocating rotation of said at least one information-carrying member; and manually operated pattern selection means (17, 18, 228) for selecting one of the stitch patterns, said pattern selection means being connected to said control means for selectively rendering one sequence corresponding to a desired stitch pattern effective, and being connected to said drive means for driving said step motor to position said at least one information-carrying member for enabling said scanning means firstly to pick up a predetermined starting information in the group corresponding to the desired stitch pattern upon start of running of said sewing machine;

whereby each set of pattern information for successively forming one stitch pattern is sequentially picked up as a result of intermittent rotation of said at least one information-carrying member at a rate of a small angle per step of said step motor.

2. The sewing machine according to claim 1, wherein said control means comprises a control means in which said sequences are constituted such that the maximum rotation angle per step of said information-carrying member is twice as much as the minimum rotation angle per step of said step motor.

3. The sewing machine according to claim 1, wherein said at least one information-carrying member includes some of said defined regions in which more than four pieces of pattern information are recorded, which pattern information can be first picked up for forming a single stitch pattern upon said one reciprocating rotation, within one of said some defined regions, of said at least one information-carrying member relative to said scanning means.

4. The sewing machine according to claim 1, wherein said at least one information-carrying member comprises a single pattern cam member formed with a plurality of stepped cam surfaces each of which carries pattern information, and said scanning means comprises a contact finger operatively connected to said one stitch-forming instrumentality and engageable with said cam surfaces.

5. The sewing machine according to claim 1, wherein said pattern selection means includes a pattern sensing device for sensing a pre-determined starting position within each of said defined regions on said at least one information-carrying member, and indicating means responsive to output signals from said pattern sensing device for indicating each specific one of said stitch patterns.

6. In a regulating system of a sewing machine, which is provided with stitch forming instrumentalities, responsive to pattern information for regulating at least one of said stitch forming instrumentalities including:
   a single pattern cam member (38 or 40) carrying a plurality of pieces of pattern information recorded thereon for forming a plurality of stitch patterns;
   a contact finger (49 or 50) engageable with said cam member under a spring action for selectively sensing the pattern information from said cam member;
   actuating means (51, 81, 83; 89, 52, 82, 84, 89) operative in timed relation with the sewing machine for disengaging said contact finger from said cam member;
   a step motor (35) operatively connected to said cam member for rotating said cam member in either of forward and reverse directions upon disengaging of said contact finger from said cam member; and
   drive means (192) responsive to control signals applied thereto for driving said step motor;
   said cam member (38 or 40) being formed with a plurality of stepped cam surfaces (37 or 39) each carrying pattern information, which are shaped within a plurality of defined regions on said cam member in a form of information groups for each stitch pattern;
   each of said cam surfaces in each of said groups being so arranged that said contact finger may sequentially engage therewith during one reciprocating rotation of said cam member;
   control means (253-255) for applying said control signals to said drive means for intermittently rotating said cam member in timed relation with said sewing machine, according to individually predetermined sequences for each stitch pattern and for said one reciprocating rotation of said cam member;
   manually operative pattern selection means (228) for selecting one of said stitch patterns, said pattern selection means (228) being connected to said control means for selectively rendering one sequence corresponding to a desired stitch pattern effective, and being connected to said drive means for driving said step motor to position said cam member for enabling said contact finger firstly to engage with a predetermined cam surface for starting the pattern-formation in the group of stepped cam surfaces corresponding to said desired stitch pattern upon start of running of said sewing machine; and
   release means (90,93) responsive to the operation of said pattern selection means for disengaging said contact finger from said cam member to permit the rotation of said cam member upon operation of said pattern selection means;
   whereby each pattern information for successively forming one stitch pattern is sequentially picked up as a result of intermittent rotation of said cam member at a rate of a small angle per step by said step motor.

* * * * *